United States Patent
Uyeno et al.

(10) Patent No.: US 11,815,676 B2
(45) Date of Patent: Nov. 14, 2023

(54) ACTIVE PUSHBROOM IMAGING SYSTEM USING A MICRO-ELECTRO-MECHANICAL SYSTEM (MEMS) MICRO-MIRROR ARRAY (MMA)

(71) Applicant: Raytheon Company, Waltham, MA (US)

(72) Inventors: Gerald P. Uyeno, Tucson, AZ (US); Sean D. Keller, Tucson, AZ (US); Benn H. Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 490 days.

(21) Appl. No.: 17/024,436

(22) Filed: Sep. 17, 2020

(65) Prior Publication Data

US 2022/0082816 A1    Mar. 17, 2022

(51) Int. Cl.
  *G02B 26/08*   (2006.01)
  *G02B 26/10*   (2006.01)
  *H04N 23/56*   (2023.01)

(52) U.S. Cl.
  CPC ....... *G02B 26/101* (2013.01); *G02B 26/0833* (2013.01); *H04N 23/56* (2023.01)

(58) Field of Classification Search
  CPC ... G02B 26/101; G02B 26/0833; H04N 23/56
  See application file for complete search history.

(56) References Cited

U.S. PATENT DOCUMENTS

| 5,404,375 A | 4/1995 | Kroeger et al. |
| 5,854,702 A | 12/1998 | Ishikawa et al. |
| 6,181,450 B1 | 1/2001 | Dishman et al. |

(Continued)

FOREIGN PATENT DOCUMENTS

| DE | 102011104023.8 B4 | 7/2019 |
| EP | 2667142 A1 | 11/2013 |

(Continued)

OTHER PUBLICATIONS

"U.S. Appl. No. 17/007,917, Response filed Dec. 1, 2021 to Non Final Office Action dated Aug. 3, 2021", 16 pgs.

(Continued)

*Primary Examiner* — Euncha P Cherry
(74) *Attorney, Agent, or Firm* — Schwegman Lundberg & Woessner, P.A.

(57) ABSTRACT

An active imaging system uses a MEMS Micro-Mirror Array to form and scan an optical beam over a first portion of scene within a first edge region of the field-of-view of the optical receiver in the direction of motion of the imaging system. In addition to tip and tilt control of the mirrors, the MMA may have piston control which can be used to minimize diffraction losses when focusing and scanning the beam, provide wavefront correction or to compensate for path length variations. The MMA may be partitioned into segments to independently form and scan a plurality of optical beams, which may be used to scan the first or different portions of the scene. The different segments may be provided with reflective coatings at different wavelengths to provide for multi-spectral imaging. The different segments may be used to combine multiple optical sources to increase power or provide multi-spectral illumination.

22 Claims, 12 Drawing Sheets

(56) References Cited

U.S. PATENT DOCUMENTS

| | | |
|---|---|---|
| 6,271,953 B1 | 8/2001 | Dishman et al. |
| 6,327,063 B1 | 12/2001 | Rockwell |
| 6,526,352 B1 | 2/2003 | Breed et al. |
| 6,567,574 B1 | 5/2003 | Ma et al. |
| 6,792,028 B2 | 9/2004 | Cook et al. |
| 6,816,315 B1 | 11/2004 | Ai et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,884,997 B2 | 2/2011 | Goodno |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,364,334 B2 | 1/2013 | Au et al. |
| 8,368,889 B2 | 2/2013 | Schwiegeriing et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 9,946,259 B2 | 4/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,321,037 B2 | 6/2019 | Uyeno |
| 10,381,701 B2 | 8/2019 | Motoi |
| 10,444,492 B2 * | 10/2019 | Hopkins .............. G02B 26/105 |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2010/0030473 A1 | 2/2010 | Au et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2012/0168605 A1 | 7/2012 | Milanovic |
| 2012/0185094 A1 * | 7/2012 | Rosenstein .......... G05D 1/0272 901/1 |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 * | 8/2018 | Bishop ................ G02B 26/085 |
| 2019/0066320 A1 | 2/2019 | Uyeno et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

"U.S. Appl. No. 17/007,917, Notice of Allowance dated Jan. 10, 2022", 14 pgs.

"U.S. Appl. No. 17/007,917, Supplemental Notice of Allowability dated Apr. 19, 2022", 2 pgs.

"Mirrorcle Technologies MEMS Mirrors—Technical Overview", Mirrorcle Technologies, Inc., (2018), 7 pgs.

"U.S. Appl. No. 16/871,602, Non Final Office Action dated Nov. 9, 2020", 18 pgs.

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"High Contrast IR Wire Grid Polarizers", Edmund Optics, [Online], Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online], Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

Anderegg, Jesse, et al., "Coherently Coupled High Power Fiber Arrays", Proc. of SPIE 6102, Fiber Lasers III: Technology, Systems, and Applications 61020U, (2006), 6 pgs.

Augst, S J, et al., "Coherent and spectral beam combining fiber lasers", Proc. SPIE 8237, Fiber Lasers IX: Technology, Systems, and Applications, 823704, (Feb. 13, 2012), 11 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, YI, et al., "Shape-Optimized Electrooptic Beam Scanners: Analysis, Design, and Simulation", Journal of Lightwave Technology, vol. 17, No. 1, (Jan. 1999), 108-114.

Fan, T Y, "Laser Beam Combining or High-Power, High-Radiance Sources", IEEE Journal of Selected Topics in Quantum Electronics, vol. 11, No. 3, (May/Jun. 2005), 567-577.

Kim, et al., "Demonstration of large-angle nonmechanical laser beam steering based on LC polymer polarization grating", Proc.. of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 × 720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Redmond, Shawn, et al., "Active coherent beam combining of diode lasers", Optics Letters vol. 36, No. 6, (Mar. 15, 2011), 999-1001.

(56) References Cited

OTHER PUBLICATIONS

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.
Siegman, A. E., "Unstable optical resonators for laser applications", Proceedings of the IEEE, vol. 53, Issue 3, (Mar. 1965), 277-287.
Wang, Jinxue, et al., "Doppler Winds Lidar Technology Development and Demonstration", AIAA-2005-6772, Space 2005, Long Beach, California, Aug. 30-1, 2005, 11 pgs.
Yamamoto, R., et al., "Evolution of a Solid State Laser", Proc. SPIE 6552, Laser Source Technology for Defense and Security III, 655205, (May 10, 2007), 11 pgs.
"MEMS Mirror Array—Beam Steering Mode", [Online], Retrieved from the Internet: <www.youtube.com/watch?v=wHIUU3kKtzM>, (Aug. 10, 2017), 2 pgs.
Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.
Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.
Tsou, et al., "Extended-image spatial tracking technique for deep-space optical downlinks", Proc. SPIE 3762, Adaptive Optics Systems and Technology, (Sep. 27, 1999), 101-109.
Tuantranont, et al., "Optical beam steering using MEMS-controllable microlens array", Sensors and Actuators A: Physical vol. 91, Issue 3, (Jul. 15, 2001), 363-372.

\* cited by examiner

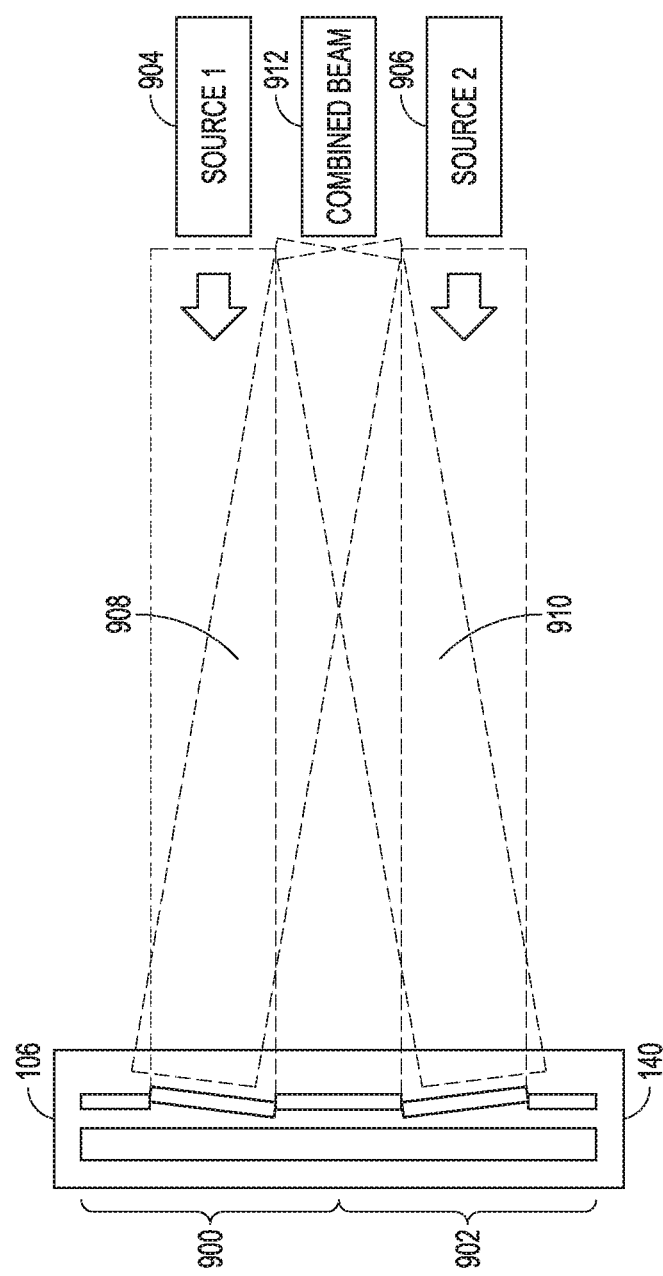

ACTIVE PUSHBROOM IMAGING SYSTEM USING A MICRO-ELECTRO-MECHANICAL SYSTEM (MEMS) MICRO-MIRROR ARRAY (MMA)

BACKGROUND OF THE INVENTION

Field of the Invention

This invention relates to active imaging systems, and more particularly to systems that scan a laser beam to illuminate selected portions of a scene.

Description of the Related Art

Typical active imaging systems use laser radiation to image a scene. The scene is imaged by sensing reflections of the laser radiation at a detector, which can often include a Focal Plane Array (FPA). FPAs generally include an array of pixels organized in rows and columns. A circuit associated with each pixel of the FPA accumulates charge corresponding to the flux of incident radiation at the corresponding pixel. Typically, the charge within the pixel is accumulated at a capacitive element, which produces a voltage proportional to the accumulated charge. The resulting voltage is conveyed by additional circuitry to an output of the FPA, and may be used to generate an image of the scene.

The ability of an imaging system to accurately convert optical energy to digital information is generally dependent on the sensitivity of the detector, and the intensity of the illumination emitted by the optical source. For example, in various conventional imaging approaches, the optical source is positioned to continuously illuminate the entire scene within a field-of-view of a receiver. Such an approach can consume a great deal of power when continuously providing the intensity of illumination necessary for high-contrast imaging across the entire scene. Alternative approaches to imaging utilize mechanical beamsteering optics, such as gimbal-based systems. Gimbals allow the physical displacement (e.g., rotation) of the system to reduce power consumption and enable selective aiming. However, these alternative approaches to imaging are, in general, limited by the capability of the mechanical elements. Limitations may include, but are not limited to, the speed of the executed scan and the pattern illumination. Moreover, these mechanical assemblies can be complex, and may increase the weight and cost of the imaging system and associated elements, such as motion compensating elements.

U.S. Pat. No. 10,321,037 entitled "Active Pushbroom Scanning System and Method" issued Jun. 11, 2019 discloses an active imaging system that includes a non-mechanical beamsteering device such as a liquid crystal waveguide (LCWG), which directs illumination over a desired extent of a scene based on a detected direction of motion of the imaging system. Although the LCWG is capable of rapid steering, the LCWG can only steer a very narrow band of wavelengths about a center wavelength. Furthermore each material system e.g., substrates, coatings and liquid crystals, and voltage settings to steer the laser beam are unique to each center wavelength. Therefore to accommodate different wavelengths requires different LCWG devices and significant investment in materials, manufacturing, set-up and calibration etc. to design and field each device. The imaging system may image a leading edge of a field-of-view of an optical receiver, or may track one or more varying features within the field-of-view, based on the detected direction of motion. The imaging system is configured to perform rapid imaging scans based on the movement of the imaging system (or variations in motion of a feature within a scene) while maintaining a reduced weight, size, and power consumption for ground, mobile, maritime, airborne, and space imaging environments.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

Aspects and embodiments are generally directed to active imaging systems and methods, and, in particular, to active imaging systems and methods which include a Micro-Electro-Mechanical System (MEMS) Micro-mirror Array (MMA) for active scanning applications. In certain examples, the active imaging system includes a MEMS MMA with tip, tilt and piston mirror actuation which directs and focuses illumination over a desired extent of a scene based on a detected direction of motion of the imaging system. Specifically, the system may image a leading edge of a field-of-view (FOV) of an optical receiver, or may track one or more varying features within the FOV, based on the detected direction of motion. Accordingly, various aspects and embodiments provide an imaging system configured to perform rapid imaging scans based on the movement of the imaging system (or variations in motion of a feature within a scene) while maintaining a reduced weight, size, and power consumption for ground, mobile, maritime, airborne, and space imaging environments.

According to an aspect, provided is an active imaging system. In one example, the active imaging system comprises a positioning system configured to detect a direction of motion of the imaging system relative to a scene to be imaged, an optical source positioned to emit electromagnetic radiation along a transmit path, a MEMS MMA positioned along the transmit path to receive the electromagnetic radiation from the optical source and configured to form and scan the electromagnetic radiation in an optical beam over at least a first portion of the scene within a FOV of an optical receiver, and the optical receiver positioned to receive reflections of the electromagnetic radiation from at least the first portion of the scene within the FOV, and the first portion of the scene is within a first edge region of the FOV of the optical receiver, the first (or leading) edge region being perpendicular to the direction of motion of the imaging system to illuminate a new portion of the scene.

In different embodiments, the MEMS MMA may use the piston actuation of the micro-mirrors in combination with tip and tilt to approximate a continuous reflective mirror surface to focus and scan the optical beam. This reduces diffraction from the edges of the mirrors thereby increasing optical power in the focused spot. Piston actuation may also be used to provide wavefront correction for the focused optical beam to compensate for atmospheric fluctuations or to compensate for path length variation of the focused optical beam through the window of the imaging system. This piston actuation appears as deviations from the continuous mirror surface.

In different embodiments, the MEMS MMA may be partitioned into a plurality of segments, each segment comprising a plurality of mirrors responsive to command signals to tip and tilt, and possibly translate, the mirrors to form the electromagnetic radiation into an optical beam. The MEMS MMA may be configured to scan the plurality of optical beams in parallel over different sub-portions of the first portion of the scene. The MEMS MMA may be partitioned into a sufficient number of segments such that each segment produces a fixed optical beam to instantly illuminate the entire first portion of the scene. Alternately, the MEMS MMA may be configured so that at least one optical beam is scanned over the first portion of the scene and at least one optical beam is scanned to revisit a previously scanned portion of the scene.

In an embodiment, the optical source emits electromagnetic radiation over a broadband that includes multiple discrete wavelengths. The micro-mirrors are provided with a reflective coating that reflects over a band that includes the multiple discrete wavelengths, whereby the optical beam comprises the multiple discrete wavelengths to scan the first portion of the scene.

In an embodiment, the MEMS MMA is partitioned into sections each comprising a plurality of mirrors. The mirrors in the different sections are provided with reflective coatings designed to reflect at different wavelengths within a specified band. Within each section, the micro-mirrors are responsive to command signals to tip and tilt, and possibly translate, the mirrors to form the electromagnetic radiation into an optical beam at the wavelength corresponding to that section. One or more sections of the MEMS MMA may be segmented to produce a plurality of independently scanned optical beams at the corresponding wavelength. The MEMS MMA may scan the optical beams at the different wavelengths over the first portion to provide multi-spectral illumination of the first portion. Alternately, the MEMS MMA may scan the plurality of focused optical beams over the first portion and a different portion of the scene.

In an embodiment, the MEMS MMA is partitioned into sections each comprising a plurality of mirrors. A plurality of optical sources are positioned to emit electromagnetic radiation along different transmit paths, each path illuminating a different section of the MEMS MMA. Each said section is configured to form and scan the electromagnetic radiation in an optical beam and to combine the plurality of focused optical beams into a combined focused optical beam. In the case where the optical sources all emit at the same wavelength the combined focused optical beam behaves as if it were emitted from a single aperture laser, but with higher power than can be obtained from a single laser aperture. In the case where the optical sources emit at different wavelengths, the combined focused optical beam is multi-spectral.

These and other features and advantages of the invention will be apparent to those skilled in the art from the following detailed description of preferred embodiments, taken together with the accompanying drawings, in which:

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 13 is an illustration of an embodiment in which the MEMS MMA is used to combine different input optical beams, at the same or different wavelengths, into a higher power or multi-spectral combined focused output beam to scan the scene.

DETAILED DESCRIPTION OF THE INVENTION

Figure 1:
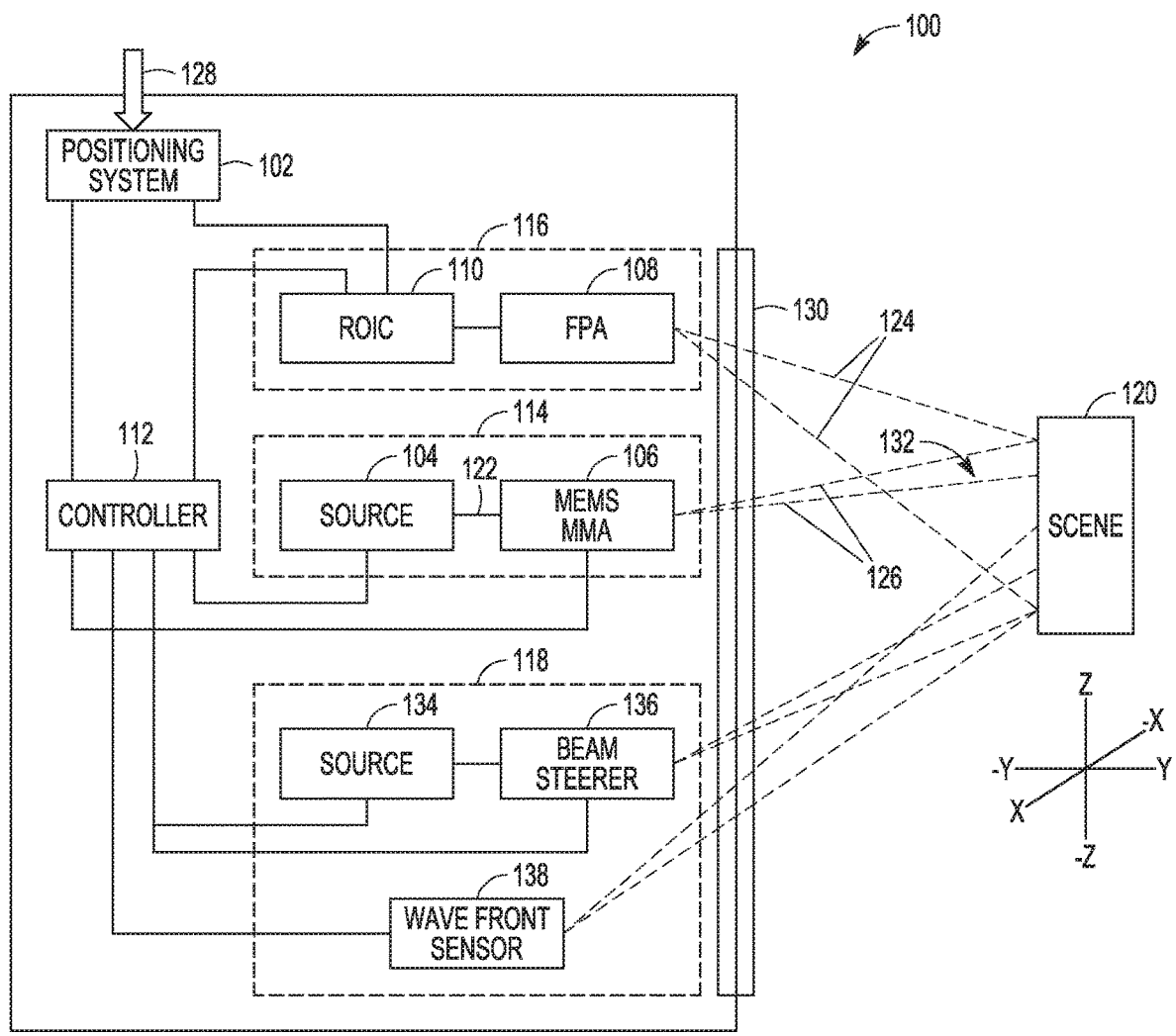
FIG. 1 is a block diagram of an example active imaging system in which a MEMS MMA is used to form and scan an optical beam according to aspects of the invention.

Aspects and embodiments are generally directed to active imaging systems and methods, and, in particular, to active imaging systems and methods which include a Micro-Electro-Mechanical System (MEMS) Micro-mirror Array (MMA) for active scanning applications. In certain examples, the active imaging system includes a MEMS MMA with tip and tilt and preferably piston micro-mirror actuation which directs and focuses illumination over a desired extent of a scene based on a detected direction of motion of the imaging system. Specifically, the system may image a leading edge of a field-of-view (FOV) of an optical receiver, or may track one or more varying features within the FOV, based on the detected direction of motion. Accordingly, various aspects and embodiments provide an imaging system configured to perform rapid imaging scans based on the movement of the imaging system (or variations in motion of a feature within a scene) while maintaining a reduced weight, size, and power consumption for ground, mobile, maritime, airborne, and space imaging environments.

LCWG steering in an active imaging system provided rapid imaging scans based on the movements of the imaging system, while maintaining a reduced weight, size, and power consumption when compared to typical imaging systems. However, LCWG steering has been found to have a number of limitations, which may include, but are not limited to, steering a very narrow band of wavelengths about a center wavelength. Furthermore each material system e.g., substrates, coatings and liquid crystals, and voltage settings to steer the laser beam are unique to each center wavelength. Therefore to accommodate different wavelengths requires different LCWG devices and significant investment in materials, manufacturing, set-up and calibration etc. to design and field each device. The LCWG cannot manipulate the wavefront of beam to, for example, focus the beam into a spot, to provide wavefront correction e.g. atmospheric distortion, or to compensate for path length differences across the beam. The LCWG can steer one and only one beam at the single wavelength. The LCWG cannot steer multiple beams of the same or different wavelengths. The LCWG is limited to receive the optical energy from a single optical source, it cannot combine the optical energy from multiple sources and focus that energy into a single focused optical beam to provide the active illumination.

Accordingly, various aspects and embodiments discussed herein provide an active imaging system configured to perform rapid imaging scans based on the movements of the imaging system with the capability to manipulate the wavefront of the beam, to segment the beam into a plurality of independently steerable beams of the same or different wavelengths and to combine multiple optical sources, while maintaining a reduced weight, size, and power consumption when compared to typical imaging systems. Various other advantages and benefits of the active imaging system and methods described herein are discussed below with reference to FIGS. 1-13.

FIG. 1 is a block diagram of an example active imaging system 100 according to certain aspects and examples. Among other components, the active imaging system 100 may include a positioning system 102, an optical source 104, a Micro-Electro-Mechanical System (MEMS) Micro-Mirror Array (MMA) 106, and an optical receiver 108. As illustrated, in certain examples the active imaging system 100 may further include a Read-Out Integrated Circuit (ROIC) 110 and control circuitry 112. In certain examples, components of the active imaging system 100 may be separated into one or more subsystems, such as the illustrated scanning subsystem 114, the illustrated detection subsystem 116 and the illustrated wavefront sense and correction subsystem 118. Each of the subsystems 114, 116, 118 may include various additional components in optical and/or electrical communication, as further discussed herein.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2A:
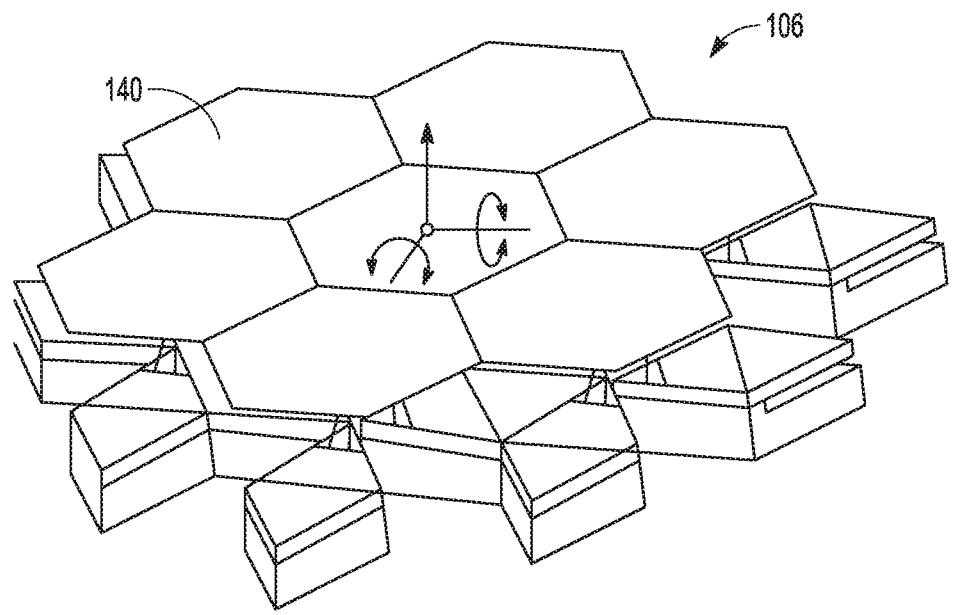
FIGS. 2A and 2B are illustrations of an embodiment of a Tip/Tilt/Piston ("TTP") MEMS MMA and a single mirror actuated to tip, tilt and translate (piston)
Figure 2B:
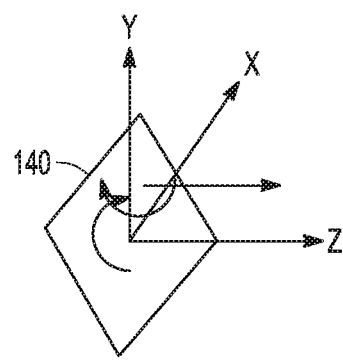

Referring to the example active imaging system 100 illustrated in FIGS. 1 and 2A-2B, the active imaging system 100 may include a positioning system 102 configured to detect a direction of motion of the imaging system 100 relative to a scene (e.g., scene 120). The positioning system 102 may be coupled to the control circuitry 112 and one or more components of the detection subsystem 116, such as the ROIC 110. In certain examples, the positioning system 102 may include a Global Positioning System (GPS) configured to receive GPS positioning information, such as time and location data 128. The GPS system may in certain embodiments include a GPS transceiver that sends and receives GPS positioning information with one or more GPS satellites. The GPS transceiver derives a three-dimensional position of the imaging system 100 based at least in part on a plurality of GPS position signals, each GPS signal being received from a respective GPS satellite. For instance, the GPS transceiver may convert the position derived from the positioning information to a longitude, latitude, and height relative to an Earth-based model. Based on a series of consecutive position measurements (e.g., longitude, latitude, and height), the positioning system 102 may determine the direction of motion of the imaging system 100, relative to the scene.

While illustrated as separate from the control circuitry 112 of the active imaging system 100, in certain examples, the positioning system 102 may be combined with one or more other components of the imaging system 100, such as the control circuitry 112. For example, the positioning system 102 and other combined components of the active imaging system 100 may include a combination of software-configured elements, control circuitry, signal processing circuitry, application specific integrated circuit, or any combination of various hardware and logic circuitry for performing the various processes discussed herein.

For example, in certain other implementations, the positioning system 102 may include a Digital Signal Processor (DSP) configured to detect a direction of motion of the imaging system 100 relative to the scene based at least in part on a variation of the scene (and/or of a feature within the scene) between a plurality of consecutively generated images of the scene. As further discussed below, in certain examples the control circuitry 112 may generate one or more images of the scene based on reflected electromagnetic radiation received from the scene at the optical receiver 108. The DSP may compare each consecutive image to ascertain one or more variations in the scene (and/or one or more variations in at least one feature therein) between the consecutive images. For example, each image may be time-stamped at the time of generation and variations in the scene or features may include motion in one or more dimensional directions of a coordinate system relative to the scene, such as the x-direction, y-direction, and z-direction illustrated in FIG. 1.

While discussed herein as including a GPS system and/or a DSP, in certain other examples the positioning system 102 may include any other suitable sensing system configured to detect a direction of motion of the imaging system 100. Such systems may include optical sensors and/or accelerometers, among other sensors. As further discussed below, various other components of the active imaging system 100 may perform various operations based on the detected direction of motion of the imaging system 100.

In particular examples, the positioning system 102 may detect that the direction of motion of the imaging system 100 relative to the scene is in any of a single-dimensional direction (e.g., x-direction), a two-dimensional direction (e.g., x-direction and y-direction), or a three dimensional-direction (e.g., x-direction, y-direction, and z-direction) within a plane of the optical detector 108. However, in certain other examples the positioning system 102 may also detect that there is an absence of movement of the system 100 relative to the scene. That is, in certain examples the positioning system 102 may determine that the imaging system 100 is stationary.

As discussed above, the positioning system 102 (e.g., the DSP) may determine a direction of motion of the scene based on one or more variations in a feature within the scene. Similarly, in certain examples the positioning system 102 may be configured to determine a direction of motion of a feature within the scene, relative to the imaging system 100. That is, the positioning system 102 may be configured to determine that the imaging system 100 is stationary, while one or more features within the scene (e.g., a vehicle) are moving relative to the imaging system 100. Similar to those processes described above, the positioning system 102 may identify movement of the feature within the scene, and determine the direction of movement of that feature based on incremental variations between consecutively generated images of the scene.

According to various examples, an optical source(s) 104 is in optical communication a Micro-Electro-Mechanical System (MEMS) Micro-Mirror Array (MMA) 106 and configured to generate and provide a beam of electromagnetic radiation. In particular, the optical source 104 may generate the beam of electromagnetic radiation at a desired wavelength, such as any wavelength of shortwave infrared (SWIR) radiation. Accordingly, in certain examples the optical source 104 may include an active SWIR laser configured to emit SWIR radiation within a wavelength range of approximately 0.9-1.7 micrometers. However, in other examples the optical source 104 may include any other suitable source of electromagnetic radiation, such as a NIR (near-infrared) laser or a visible light source. In one embodiment, electromagnetic radiation generated by the optical source 104 is coherent, and the system 100 includes one or more collimating optics. In certain embodiments, optical source 104 may emit broadband electromagnetic radiation that spans multiple discrete wavelengths. In other embodiments, different optical sources 104 may emit electromagnetic radiation at different discrete wavelengths, which may either span a specified broadband or may be non-contiguous. The optical source may be continuous wave laser for scene illumination such as visible, 808 nm, 980 nm or 1550 nm.

As illustrated in FIG. 1, the MEMS MMA 106 is positioned to receive the transmitted beam of electromagnetic radiation from the optical source 104. For example, the MEMS MMA 106 may receive the transmitted beam of electromagnetic radiation via an optical fiber or free space coupling along a transmit path 122. Responsive to receiving the electromagnetic radiation, the MEMS MMA 106 may be controlled via command signals to direct the electromagnetic radiation generated by the optical source 104 through an optically transparent window 130 to form and scan an optical beam 132 over at least one portion of the scene. In particular, the MEMS MMA 106 may scan the electromagnetic radiation over a portion of the scene within a field-of-view of the optical receiver 116. This may include directing the electromagnetic radiation over a section of the scene that is less than the entire filed-of-view of the optical receiver 108, as illustrated in FIG. 1. Within FIG. 1, the field-of-view (FOV) of the optical receiver 108 taken at a particular instant is illustrated by the range 124, and the scanned electromagnetic radiation is indicated by the range 126. Over time, the optical receiver's FOV will scan a larger field-of-regard (FOR).

In certain examples, the MEMS MMA 106 is configured to scan the received electromagnetic radiation over a portion of the scene within an edge region of the field-of-view of the optical receiver 108. As discussed herein, each edge region may refer to one or more sections of the perimeter of the field-of-view of the optical receiver 108. In particular, the MEMS MMA 106 may be configured to scan the received electromagnetic radiation over a portion of the scene within an edge region of the field-of-view that corresponds to the detected direction of motion of the imaging system 100 (e.g., a "leading" edge of the field-of-view). For example, the control circuitry 112 may locate the portion of the scene that corresponds to the leading edge of the field-of-view based on the direction of motion detected by the positioning system 102. Once located, the control circuitry 112 may operate the MEMS MMA 106 to scan the electromagnetic radiation in an orientation substantially perpendicular to the direction of motion, at the leading edge of the field-of-view. In various examples, the leading edge may be intersected by a vector with an origin at the center of the field of view in the direction of relative motion of the imaging system 100.

In certain examples, the optical path length of optical beam 132 will vary across the spatial extent of the beam due to either a non-uniform thickness of optically transparent window 130, which may be flat, hemispheric, ogive or other shape, or the angle of the beam through the window. This induces curvature to the wavefront. The MEMS MMA 106 may be configured through calibration to compensate for variations in path length and remove the curvature.

In certain examples, it is desirable to compensate for atmospheric distortion, which varies with time. A source 134 is positioned to emit electromagnetic radiation e.g. SWIR in an optical beam preferably having a "flat-top" intensity profile. Source 134 may be a pulsed laser at 1064 nm. A beam steerer 136 such as a rotating mirror, LCWG or MEMS MMA steers the beam to illuminate scene 120. A wavefront sensor 138 measures the wavefront of the reflected optical beam. Alternate embodiments may combine some or all functions of the imaging and wavefront correction sensor into a single system including the optical source, beam steering and sensor. Control circuitry 112 generates command signals to configure the MEMS MMA to compensate for the atmospheric distortion.

As best shown in FIGS. 2A-2B, Micro-Electro-Mechanical System (MEMS) Micro-mirror Array (MMA) 106 comprises a plurality of independently and continuously controllable mirrors 140 to form and steer the optical beam(s). Each mirror is capable of at least "Tip" (rotation about an X-axis) and "Tilt" (rotation about a Y-axis). In preferred embodiments, each mirror is also capable of "Piston" (translation along a Z-axis, perpendicular to the XY plane) where the X, Y and Z are orthogonal axes in a three-dimensional space. The Piston capability can be used to improve the formation and scanning of the optical beam by approximating a continuous surface across the micro-mirrors, which reduces unwanted diffraction to increase power in the focused optical beam. The Piston capability can also be used to provide selective deviations from the continuous mirror surface to compensate for, for example, path length differences across the optical beam and atmospheric distortion. The MEMS MMA is preferably capable of steering an output laser beam over a steering range of at least −10° x+10° in tip and tilt and +/−10 microns (at least one-half wavelength in either direction) piston at a rate of at least 1 KHz (<1 millisecond). The independently controllable mirrors can be adaptively segmented to form any number of optical beams, adjust the size/power of a given optical beam, generate multi-spectral optical beams and to combine multiple input sources. Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. This MEMS MMA is currently being commercialized by Bright Silicon technologies for "digitally controlling light."

Figure 3:
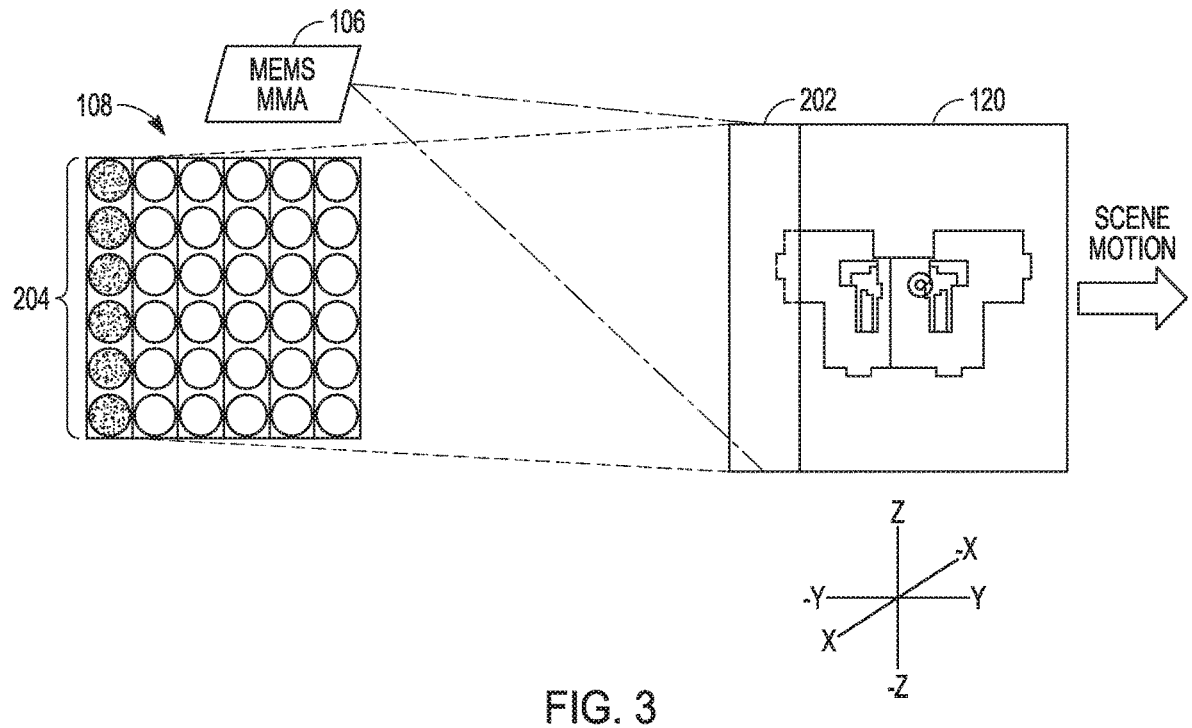
FIG. 3 is an example illustration of electromagnetic radiation received at the optical receiver of the active imaging system illustrated in FIG. 1, according to aspects of the invention.

Referring to FIG. 3, illustrated is an example of electromagnetic radiation received at a subset 204 of a plurality of pixels of the optical receiver 108 of the active imaging system 100 illustrated in FIG. 1, during one mode of operation. In particular, FIG. 3 illustrates an example of the scanning operations performed by the imaging system 100 while moving in a single-dimensional linear direction. Solely for the purpose of illustration, the direction is shown in the positive y-direction in FIG. 3. During the illustrated operations, the MEMS MMA 106 directs electromagnetic radiation over a portion of a scene 120 (e.g., portion 202) that corresponds to an edge region of the field-of-view of the optical receiver 108. FIG. 3 shows the MEMS MMA 106 scanning the electromagnetic radiation perpendicular to the direction of motion of the imaging system 100 (i.e., the negative y-direction). As illustrated, while moving in a single-dimensional direction, the direction of motion of the scene is substantially opposite the direction of the imaging system 100. Accordingly, FIG. 3 illustrates the MEMS MMA 106 scanning the electromagnetic radiation over the portion of the scene at the leading edge of the field-of-view. While illustrated in FIG. 3 as scanning the portion immediately adjacent the leading edge of the field-of-view, in certain examples the MEMS MMA 106 may scan a portion of the scene slightly offset from the leading edge. Moreover, in certain other examples, the MEMS MMA 106 may switch between various scan patterns during operation and may not remain fixed on the leading edge of the field-of-view.

Figure 4:
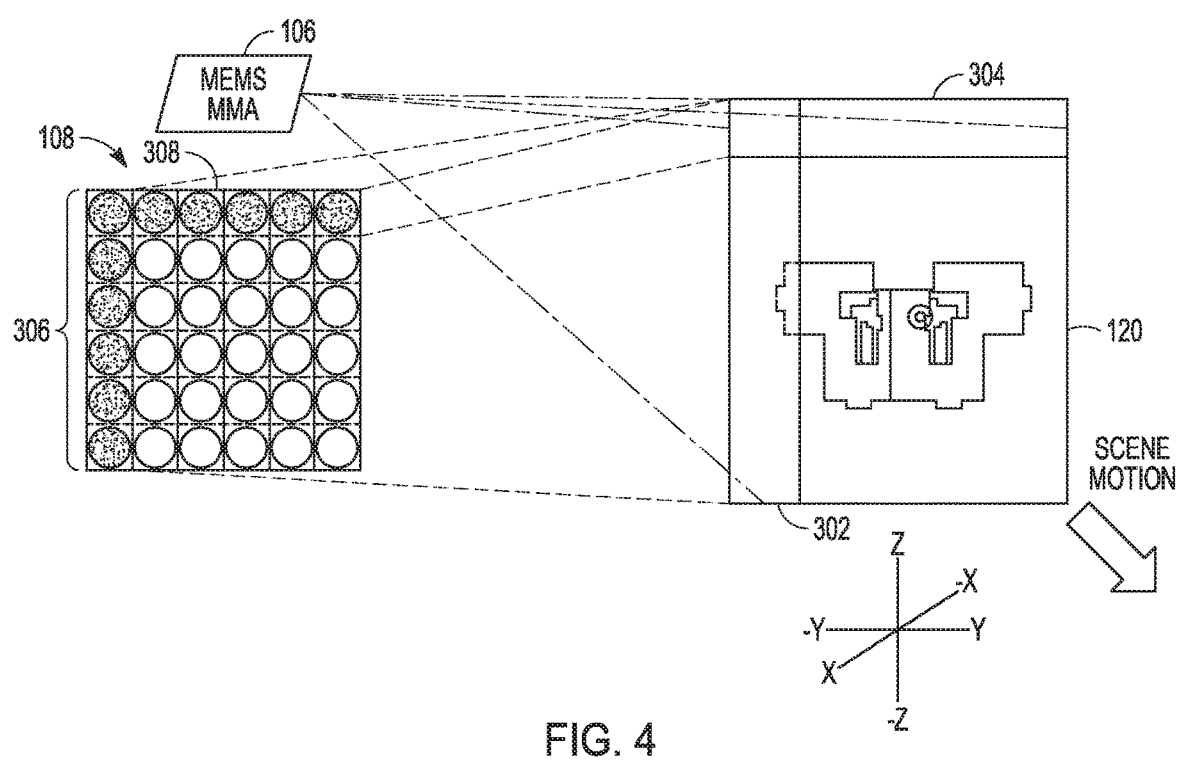
FIG. 4 is another example illustration of electromagnetic radiation received at the optical receiver of the active imaging system illustrated in FIG. 1, according to aspects of the invention.

Referring to FIG. 4, illustrated is an example of electromagnetic radiation received at a subset 306 of a plurality of pixels of the optical receiver 108 of the active imaging system 100 illustrated in FIG. 1 during another mode of operation. In particular, FIG. 4 illustrates an example of the scanning operations performed by the imaging system 100 while moving in a two-dimensional direction. Solely for the purpose of illustration, the direction of motion of the scene is shown in the positive y-direction and the negative z-direction in FIG. 4. During the illustrated operations, the MEMS MMA 106 scans electromagnetic radiation over the portions (e.g., first portion 302 and second portion 304) of the scene 120, which correspond to a first edge region and a second edge region of the field-of-view, in the direction of motion for the motion in the positive y and negative z direction. As illustrated, while moving in a two-dimensional direction, the direction of motion of the imaging system 100 is substantially opposite the direction of the scene (i.e., the negative y-direction and the positive z-direction). In the illustrated example, the direction of motion of the imaging system 100 is diagonal relative to the scene being imaged. Accordingly, the MEMS MMA 106 illuminates the portion of the scene at the leading edge of the field-of-view in both the negative y-direction and the positive z-direction. As illustrated, the scanned illumination in each direction is in a substantially perpendicular orientation relative to the detected direction of motion in the positive y and negative z directions. While in one example, the MEMS MMA 106 may simultaneously scan over the first portion 302 and the second portion 304 (e.g., in a "L" shaped pattern), in other examples the MEMS MMA 106 may rapidly scan the first portion 302 and the second portion 304 sequentially.

Figure 5:
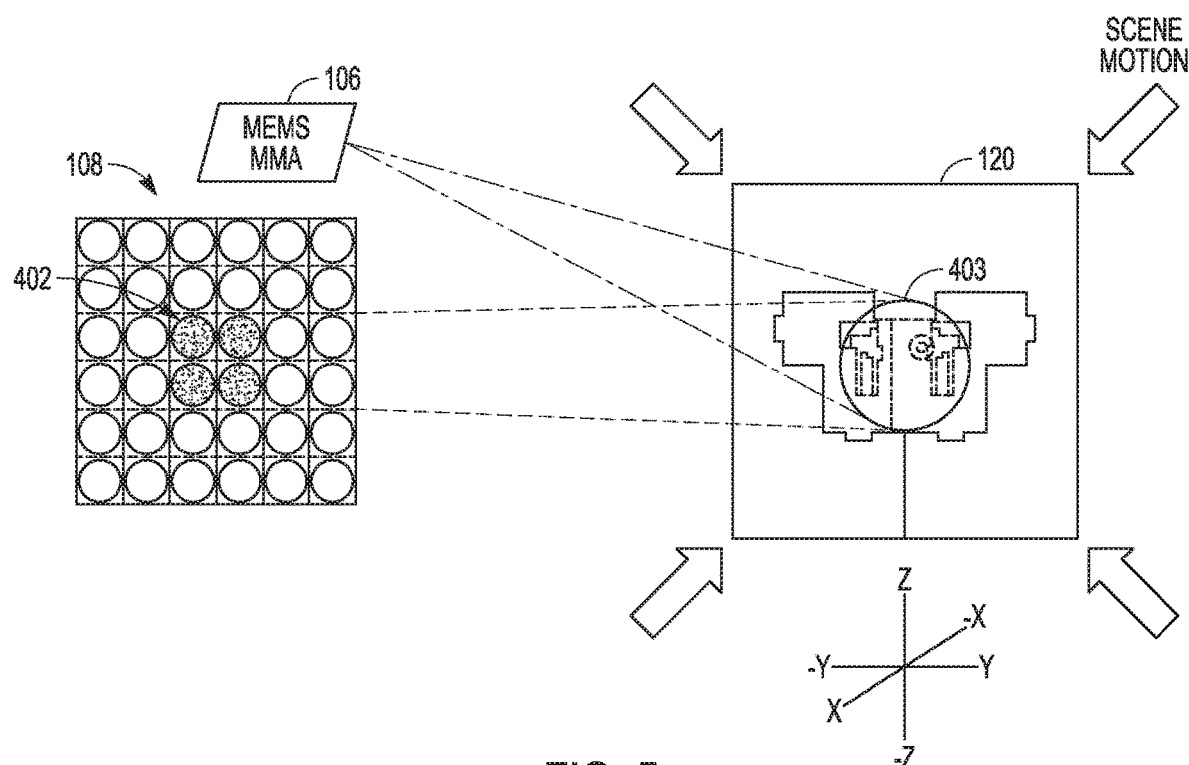
FIG. 5 is another example illustration of electromagnetic radiation received at the optical receiver of the active imaging system illustrated in FIG. 1, according to aspects of the invention.

Referring now to FIG. 5, illustrated is another example of electromagnetic radiation received at a subset 402 of a plurality of pixels of the optical receiver 108 of the active imaging system 100 illustrated in FIG. 1. Specifically, FIG. 5 illustrates the imaging system 100 during a mode of operation in which the MEMS MMA 106 scans electromagnetic radiation over a portion of the scene 120 (e.g., portion 403) which corresponds to a substantially center portion of the field-of-view of the optical receiver 108. Solely for the purpose of illustration, FIG. 5 shows the direction of motion of the scene in the negative x-direction. That is, the direction of motion of the imaging system 100 is away from the scene being imaged. Accordingly, the MEMS MMA may illuminate the portion of the scene at the leading edge of the field-of-view in the x-direction (illustrated in FIG. 5 as the center of the field-of-view).

While FIGS. 3, 4, and 5 illustrate particular examples of scanning processes performed by the MEMS MMA 106, in other examples, the MEMS MMA 106 may perform other scanning processes and may dynamically switch between the modes illustrate din FIGS. 3-5 and the other scanning processes. These other scanning processes may provide various benefits during target tracking operations, such as improved accuracy, speed, and functionality. For instance, the MEMS MMA 106 may be configured to scan electromagnetic radiation in a direction substantially parallel to the detected direction of motion of the imaging system 100 (e.g., "crabbing"). For example, the MEMS MMA 106 may scan the electromagnetic radiation over a portion of the scene within the field-of-view in the y-direction, while the imaging system 100 is oriented to move in the y-direction, but actually moves in the z-direction for small periods of time.

In certain other examples, the MEMS MMA 106 may be controlled to dynamically track a feature within the field-of-view. In such an example, the MEMS MMA 106 may direct the electromagnetic radiation to follow a desired feature within the scene. For instance, the MEMS MMA 106 may scan electromagnetic radiation in a direction substantially parallel and opposite to a detected direction of motion of the imaging system 100 relative to an object (e.g., a target) within the scene. In some other examples, the MEMS MMA 106 may scan the electromagnetic radiation in a direction substantially parallel and in alignment with the detected direction of motion of the imaging system 100 relative to the object. In still some other examples, the MEMS MMA 106 may scan the electromagnetic radiation in alignment with, or opposite, a direction of rotation of the imaging system 100 relative to the object within the scene. In certain other examples, the MEMS MMA 106 may be controlled to simultaneously scan the first portion of the scene while dynamically tracking one or more features within the field-of view. Some or all of these features may have been previously scanned.

As discussed in further detail below, the MEMS MMA 106 may be controlled to transmit the electromagnetic radiation in the direction of the scene as a "fan" beam or a "spot" beam. In one example, a "fan" beam includes a beam of electromagnetic radiation having a narrow beamwidth in one dimension (e.g., a horizontal direction), and a wider beamwidth in another dimension (e.g., a vertical direction). In contrast, a "spot" beam may include a beam of electromagnetic radiation having a concentrated area of substantially uniform shape.

For example, the imaging system 100 may include one or more optical elements (e.g., lens) optically coupled with the MEMS MMA 106 and positioned so as to adjust a cross-section of the electromagnetic radiation to a shape which corresponds to one or more dimensions of the optical detector 108). For instance, a substantially rectangular cross-section may be beneficial if the scanning pattern performed by the MEMS MMA 106 is perpendicular to the direction of motion of the imaging system 100 relative to the scene. In certain other examples, the MEMS MMA 106 may rapidly scan electromagnetic radiation having a substantially circular cross-section across the portion of the scene. For instance, the MEMS MMA 106 may scan the substantially circular electromagnetic radiation over a single row or column of pixels within the optical detector 108 within an integration time of the detector 108. In another example, the imaging system may include a first optical element which converts a substantially circular cross-section to a rectangular cross-section in a first dimension, and a second optical element which converts the substantially circular cross-section to a rectangular cross-section in a second dimension. In such an example, MEMS MMA 106 may scan the electromagnetic radiation in a substantially "L" shaped pattern, as discussed above. Accordingly, various approaches may be used to achieve a spot beam or a fan beam, as described herein.

As illustrated in FIGS. 1-5, the system 100 may include an optical receiver 108. The optical receiver 108 includes a plurality of individual detector elements, which may be referred to as pixels. The optical receiver 108 may include a single pixel or a line of pixels. In one implementation the optical receiver 108 may include a Focal Plane Array (FPA) having a plurality of pixels arranged in a series of rows and columns. When activated to receive electromagnetic radiation, each pixel of the optical receiver 108 is designed to collect and integrate photons of light impinging on that respective pixel. A circuit associated with each pixel of the optical receiver accumulates charge corresponding to the flux of incident electromagnetic radiation during the integration period. In one implementation, each pixel of the optical receiver 108 may include a complementary metal-oxide semiconductor (CMOS) sensor or a charge-coupled device (CCD). In some embodiments, charge-injection devices (CIDs) may also be used for pixels.

In various embodiments, the ROIC 110 is in optical and electrical communication with the optical receiver 108 (e.g., the FPA), and in particular, each pixel of the optical receiver 108. The ROIC 110 is configured to activate each pixel of the optical receiver 108 during the integration period. In particular, the ROIC 110 of various embodiments is configured to activate pixels of the optical receiver 108 to collect reflections of the electromagnetic radiation reflected from the portion of the scene illuminated by the MEMS MMA 106. In certain examples, the MEMS MMA 106 may adjust a dwell time of the imaging system 100 to compensate for non-uniformities and improve the performance of the optical receiver 108.

"Row" and "column" as used herein, may be interchanged according to various embodiments. That is, although "row" may generally be used to refer to a horizontal positioning and "column" may generally be used to refer to a vertical positioning, as used herein either may be used to refer to a horizontal positioning and a vertical positioning relative to the other.

In various embodiments, the MEMS MMA 106 is configured to direct optical radiation over an area of the scene that corresponds to the activated unit cells of the optical receiver 108. In one embodiment, the ROIC 110 is configured to activate one or more unit cells of the optical receiver 108 responsive to direction of the optical radiation by the MEMS MMA 106. For example, the ROIC 110 may activate a subset of the plurality of pixels of the optical receiver 108 that corresponds to the leading edge of the field-of-view of the optical receiver 108, the trailing edge of the field-of-view, or any other subset of the plurality of pixels.

After the expiration of the integration period, the ROIC 110 is configured to deactivate each activated unit cell of the optical receiver 108 and read out a value for each deactivated unit cell. Each read out value may be transmitted to other components of the imaging system 100 and used to construct an image of the illuminated portion of the scene, and/or view (e.g., track) one or more features within the scene. In particular, the control circuitry 112 may be configured to generate a plurality of images of the scene during the operation of the imaging system 100. Each image of the scene generated by the control circuitry 112 may be a composition of the portion of the scene scanned by the MEMS MMA 106 and one or more images of a previously scanned portion. That is, in certain embodiments the control circuitry 112 is configured to "piece together" an image of the scene from various scans. In one example, the control circuitry 112 may continually refresh a section of the image based on one or more subsequent scans. For example, the control circuitry 112 may continually (e.g., automatically) refresh an area of the image that corresponds to the leading edge(s) of the field-of-view of the optical receiver 108 or may revisit and refresh an area of the image that corresponds to particular features of interest.

Referring again to FIG. 1, in various embodiments the imaging system 100 may include control circuitry 112 coupled and in electrical communication with components of the active imaging system. For example, the control circuitry 112 may be in electrical communication with the ROIC 110, the optical source 104, the MEMS MMA 106, and the positioning system 102. The control circuitry 112 may include a single controller; however, in various other embodiments the control circuitry 112 may consist of a plurality of controllers and/or other control circuitry.

The control circuitry 112 may include a combination of software-configured elements, signal processing circuitry, application specific integrated circuitry, infrared-frequency integrated circuitry, or any combination of various hardware and logic circuitry for performing the various processes discussed herein. For instance, the control circuitry 112 of various embodiments may include a processor core, memory, and programmable input/output components. The control circuitry 112 may be configured to automatically and/or dynamically control various components of the imaging system 100, such as the MEMS MMA 106.

Figure 6:
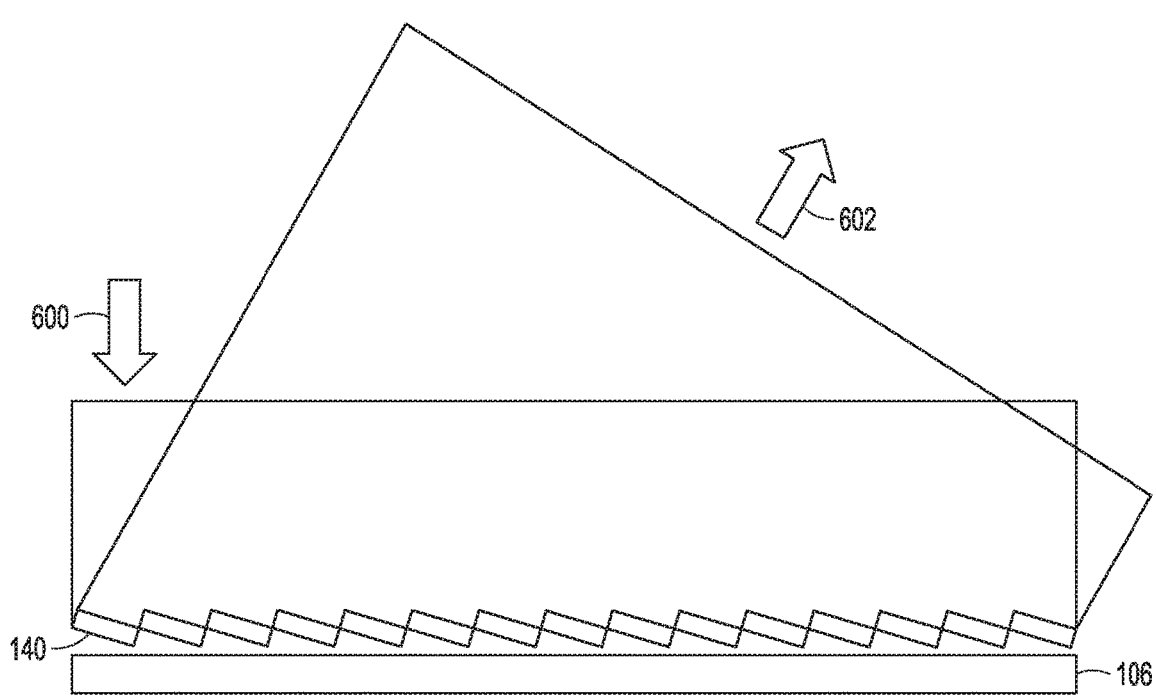
FIG. 6 is an illustration of tip and tilt mirror actuation to scan the optical beam.
Figure 7A:
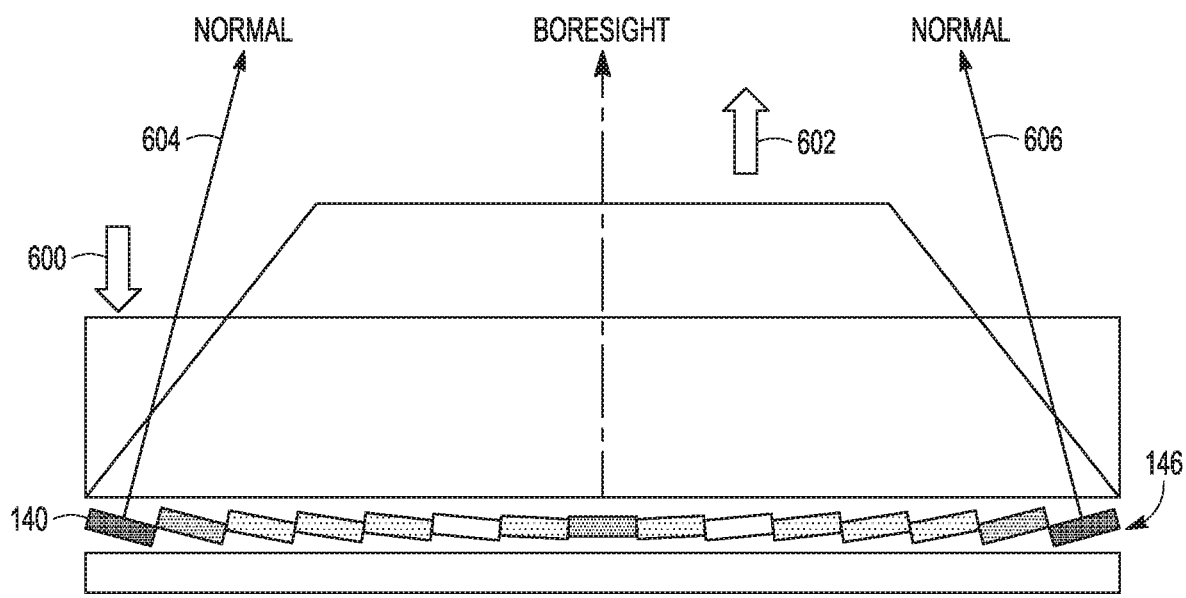
FIGS. 7A and 7B are side and top views of tip and tilt actuation to form a reflective lens to focus the optical beam into a spot.
Figure 7B:
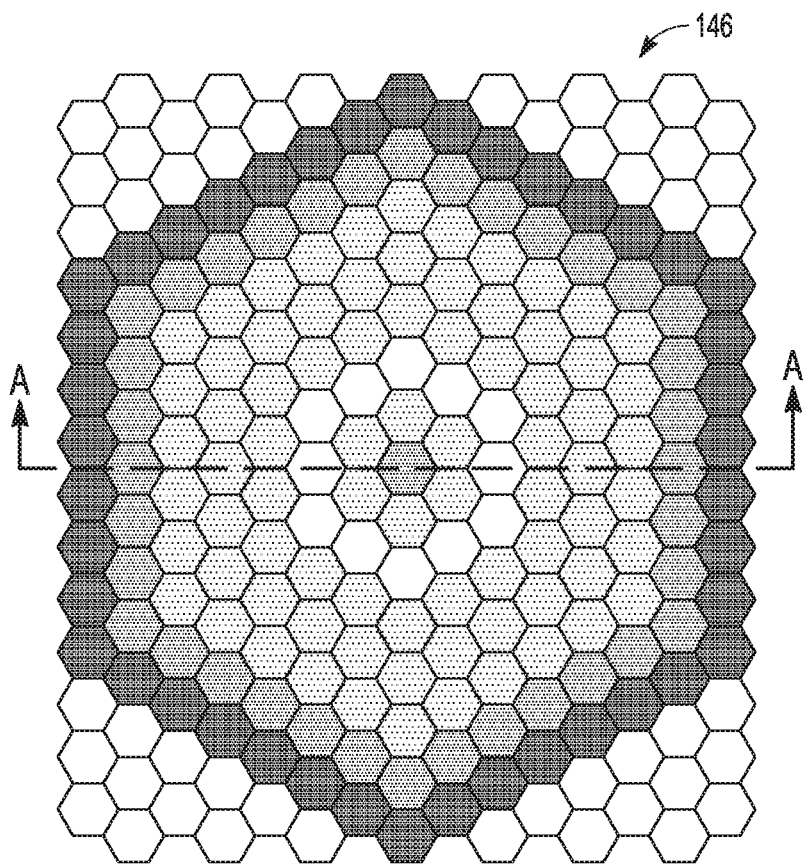
Figure 8:
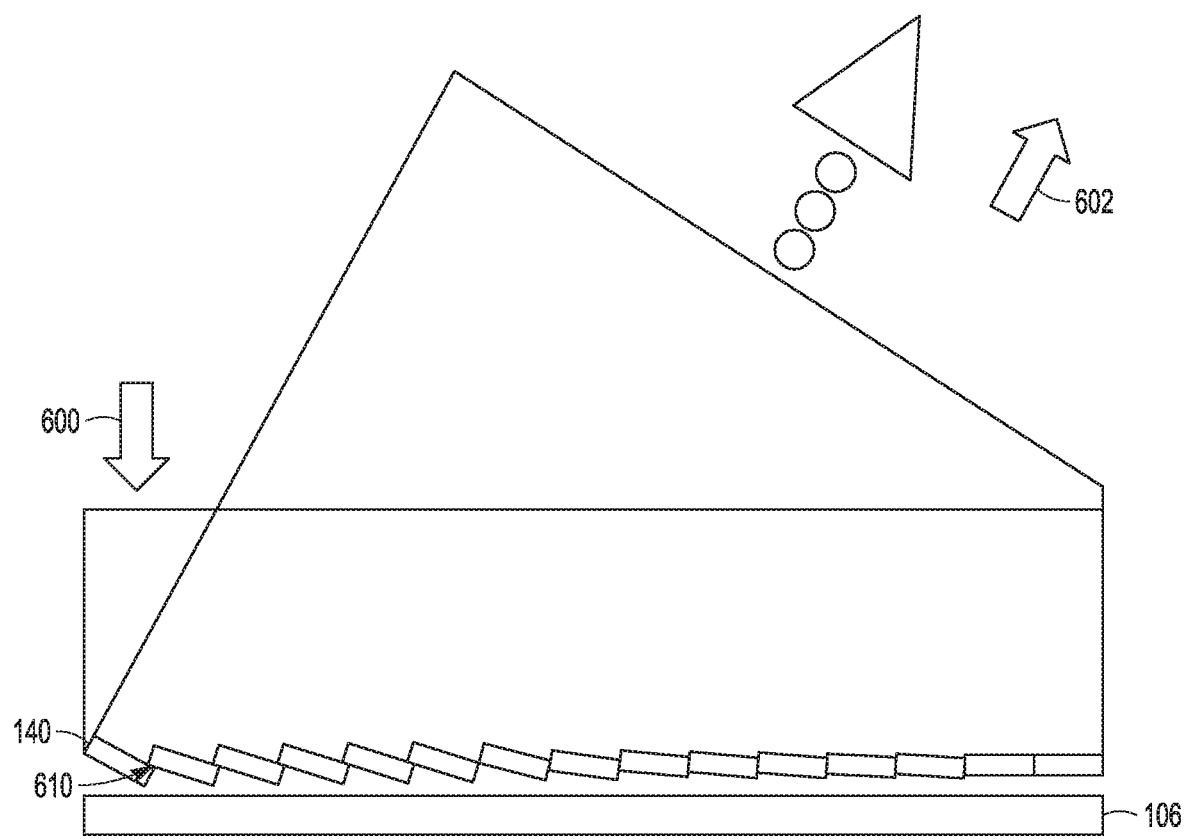
FIG. 8 is an illustration of tip and tilt mirror actuation to focus and scan the optical beam.

Referring now to FIGS. 6, 7A-7B and 8, as illustrated in FIG. 6 responsive to command signals from control circuitry 112 MEMS MMA 106 tips and tilts all the mirrors 140 by the same angle, for example, 10 degrees at an instant in time to re-direct electromagnetic radiation 600 from an optical source to form and scan an optical beam 602. As illustrated in FIGS. 7A-7B, responsive to command signals from control circuitry 112 MEMS MMA 106 selectively tips and tilts the mirrors 140 to form a lens to focus electromagnetic radiation 600 into optical beam 602. In this example, the mirrors are tipped and tilted to implement a reflective lens. The angle of the normal 604 of each mirror to the boresight 606 in the plane of the axis is the same for all mirrors in each concentric circle of mirrors. The mirrors may be controlled to implement a variety of optical lenses to focus the electromagnetic radiation into the optical beam. As shown in FIG. 8, responsive to command signals from control circuitry 112 MEMS MMA 106 tips and tilts mirrors 140 to both form a reflective lens to focus the electromagnetic radiation 600 into optical beam 602 and to steer optical beam by, for example, 10 degrees. It is important to note that the edges 610 of the mirrors exhibit discontinuities. The incident electromagnetic radiation 600 will diffract off of these discontinuities causing a loss of optical power in the focused optical beam. This problem may become more pronounced as the steering angle increases.

Figure 9:
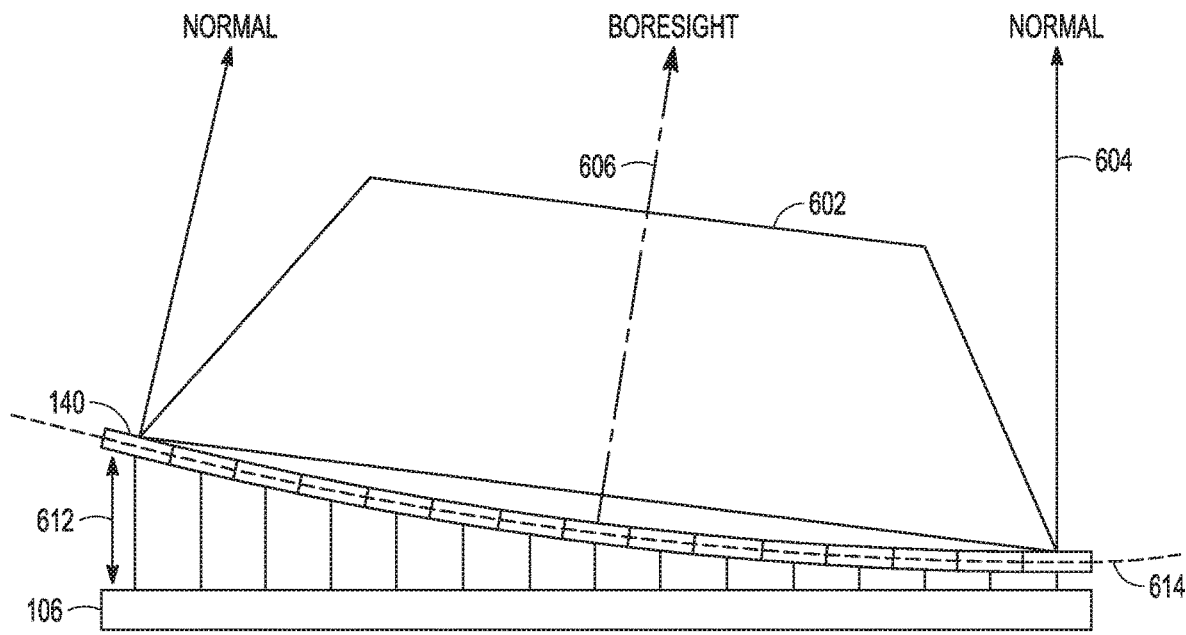
FIG. 9 is an illustration of using tip, tilt and piston mirror actuation to approximate a continuous optical surface to focus and steer an optical beam.

As illustrated in FIG. 9 responsive to command signals from control circuitry 112 MEMS MMA 106 tips, tilts and pistons (translates 612) mirrors 140 to approximate a continuous mirror surface 614 to both focus and scan optical beam 602. The continuous mirror surface 614 approximates a single surface free-space reflective optical mirror. Each mirror can suitably translate at least ½ wavelength and typically several wavelengths in either direction to form the continuous mirror surface 614. The edge discontinuities 610 and loss of power are minimized.

Figure 10:
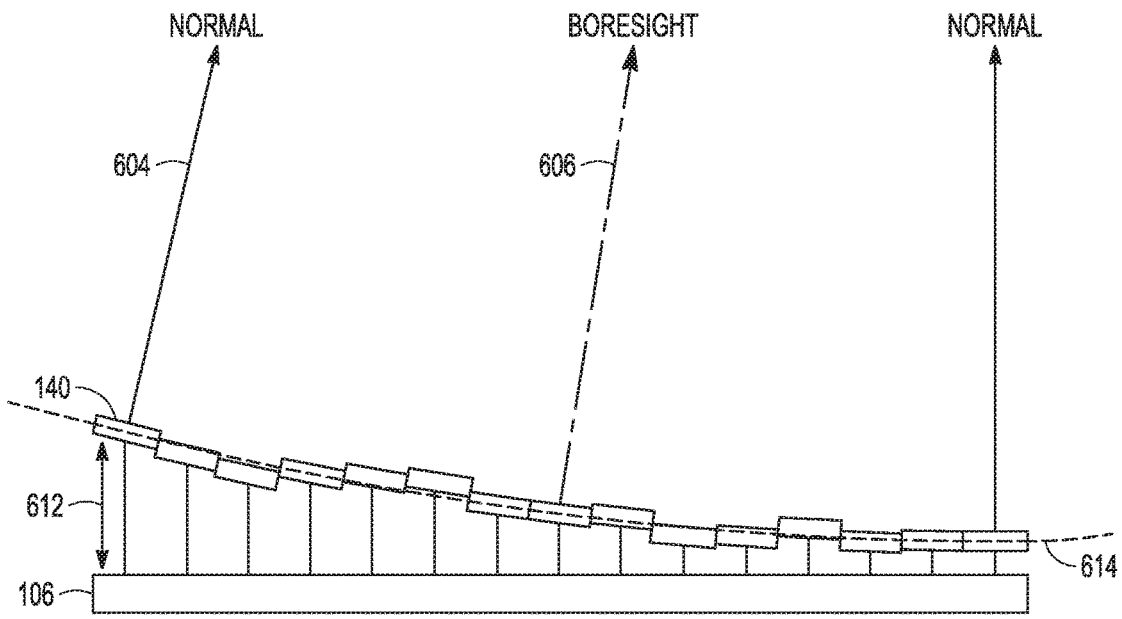
FIG. 10 is an illustration of using piston mirror actuation to produce deviations from the continuous optical surface to compensate for path length variations and/or to provide wavefront correction for optical distortion.

As illustrated in FIG. 10 responsive to command signals from control circuitry 112 MEMS MMA 106 can adjust the piston 612 of mirrors 140 to induce deviations from continuous mirror surface 614. This can be done to compensate for path length variation of the optical beam through the optically transparent window, to correct for atmospheric distortion or both. Adjustments for path length variation can be calibrated offline and stored in a lookup table (LUT) as a function of scan angle. Adjustments for atmospheric distortion are done in real-time during operation of the active imaging system. Source 134 emits electromagnetic energy in a similar band to illumination e.g., SWIR and beam steerer scans the optical beam onto scene 120. The optical beam preferably has a flat-top across the cross-section of the beam. Wavefront sensor 138 measures the wavefront of the reflected beam to determine the effects of atmospheric distortion. Control circuitry 112 computes the requisite piston adjustments required to correct the wavefront and provides them as command signals to the MEMS MMA. In high quality, high performing active imaging systems, the ability to accurately remove the effects of path length variation and atmospheric distortion is critical to achieving useful imagery of the scene, and important features identified within the scene.

As illustrated in FIGS. 11A-11D, responsive to command signals from control circuitry 112 MEMS MMA 106 is partitioned into four segments 700, 702, 704 and 706 each including a plurality of mirrors 140. The segments do not need to be equally sized, can be any portion of the array and can be changed on the fly in number, size or location. In response to command signals, the MEMS MMA tips/tilts/pistons the mirrors in each segment to independent form and scan optical beams 710, 712, 714 and 718 over different portions of scene 120. Additional piston actuation may be included to compensate for path length variation and/or to correct for atmospheric distortion in some or all of the optical beams.

Figure 11A:
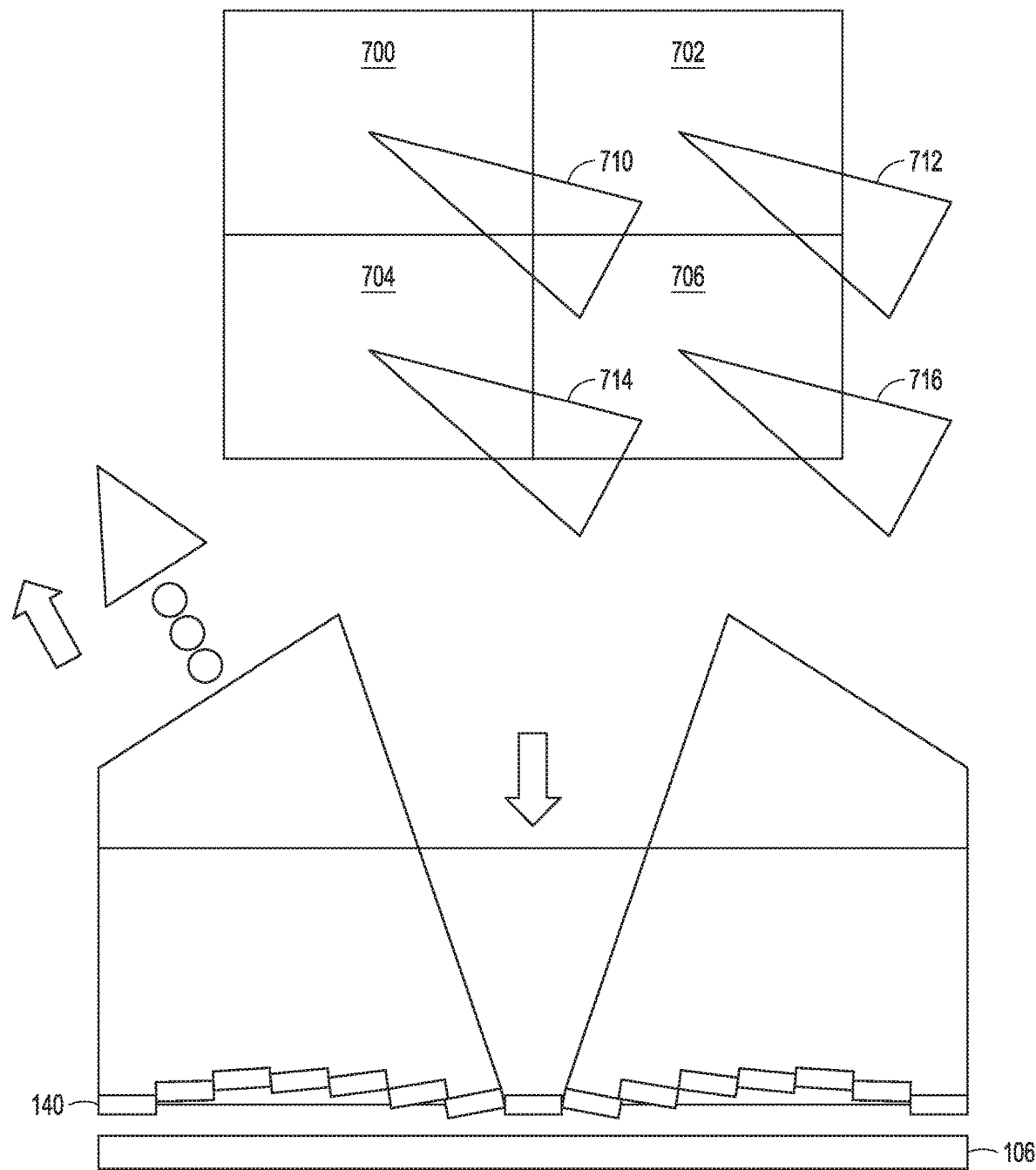
FIGS. 11A-11D are illustrations of an embodiment in which the MEMS MMA is partitioned into a plurality of segments each comprising a plurality of mirrors that focus and independently scan an optical beam over the first portion of the scene in parallel or instantly or over the first portion of the scene and to revisit previously scanned portions of the scene.
Figure 11B:
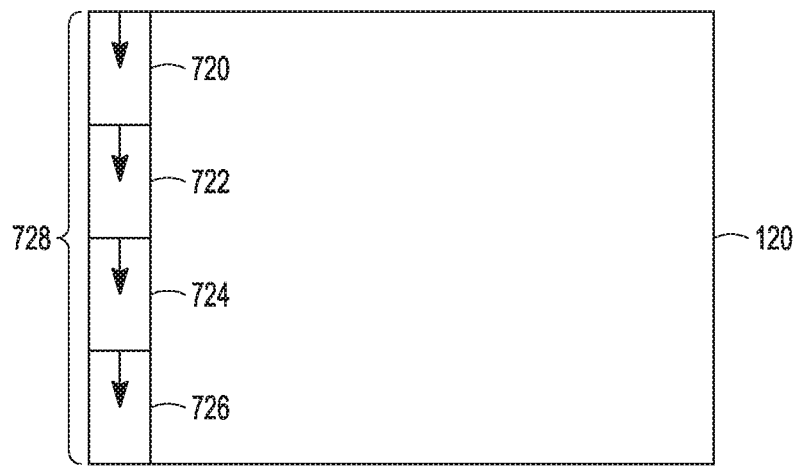

As illustrated in FIG. 11B, the four optical beams 710, 712, 714 and 718 are scanned in parallel over different regions 720, 722, 724 and 726 of a leading edge region 728 of the FOV of the optical receiver. In this manner, the first portion of the scene can be scanned in one-quarter the time.

Figure 11C:
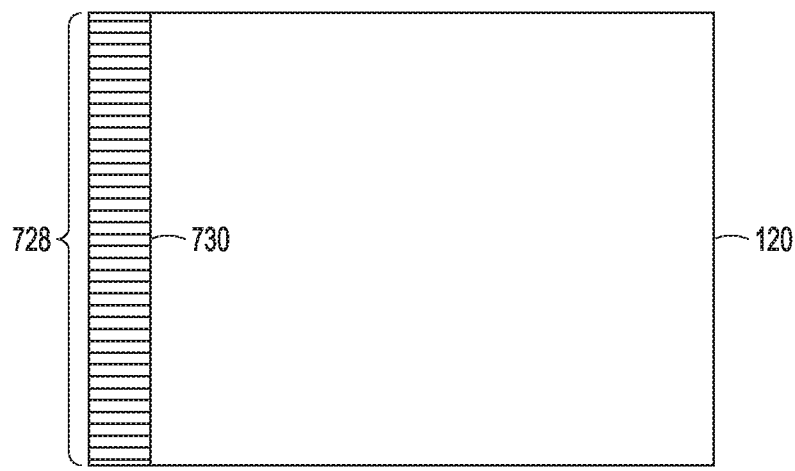

As illustrated in FIG. 11C, responsive to command signals from control circuitry 112 MEMS MMA 106 is partitioned into a plurality of segments. The mirrors in each of the segments are tipped/tilted/pistoned to form and steer at fixed angles optical beams to instantly illuminate each pixel 730 in leading edge region 728 to instantly scan the entire first portion of the scene. The entire scan occurs in an instant. The number of segments and fixed optical beams may be more or less than the number of pixels in the leading edge region.

Figure 11D:
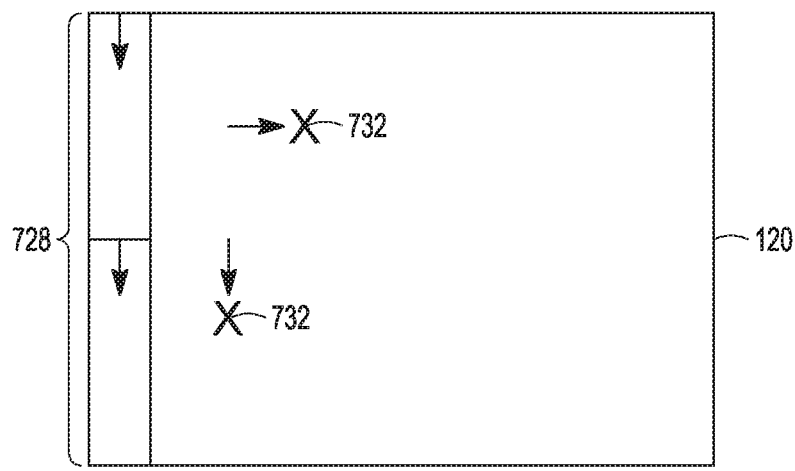
Figure 12A:
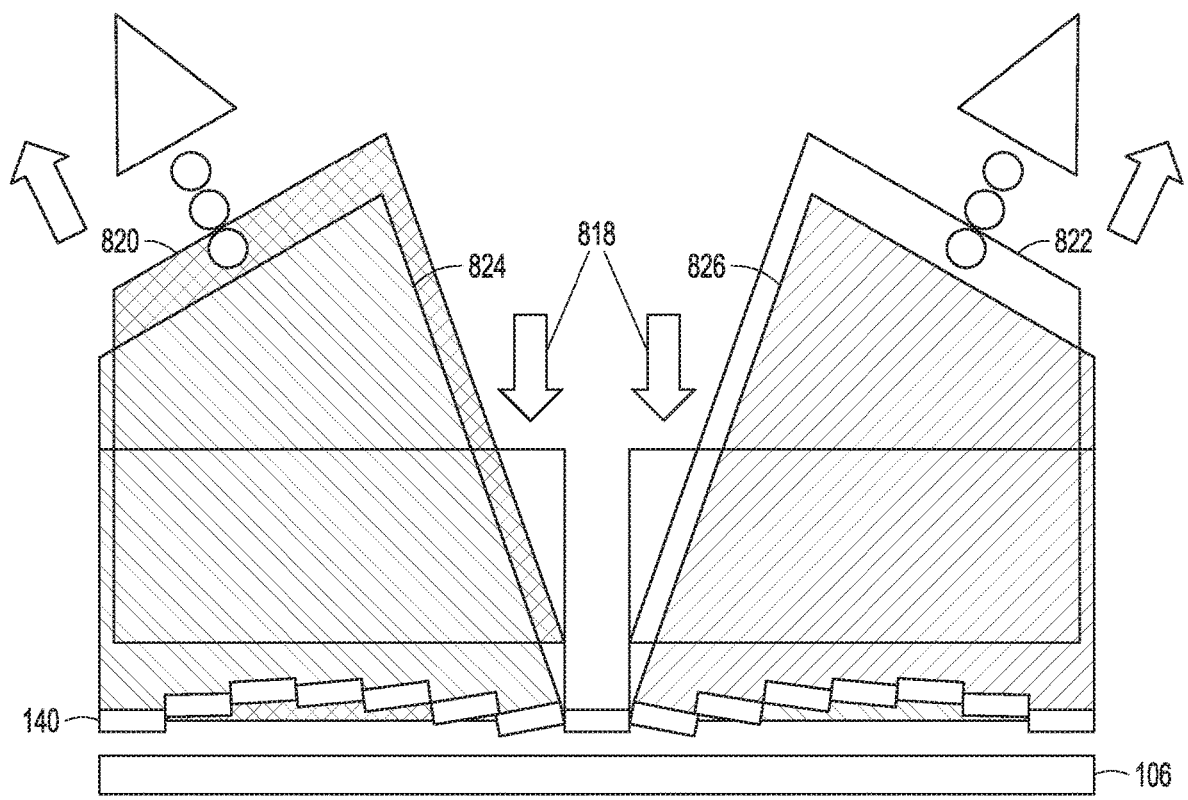
FIGS. 12A-12B are illustrations of an embodiment in which the MEMS MMA is partitioned into a plurality of sections each comprising a plurality of mirrors that are provided with reflective coatings at different wavelengths to focus and independently scan focused optical beams at different wavelengths.
Figure 12B:
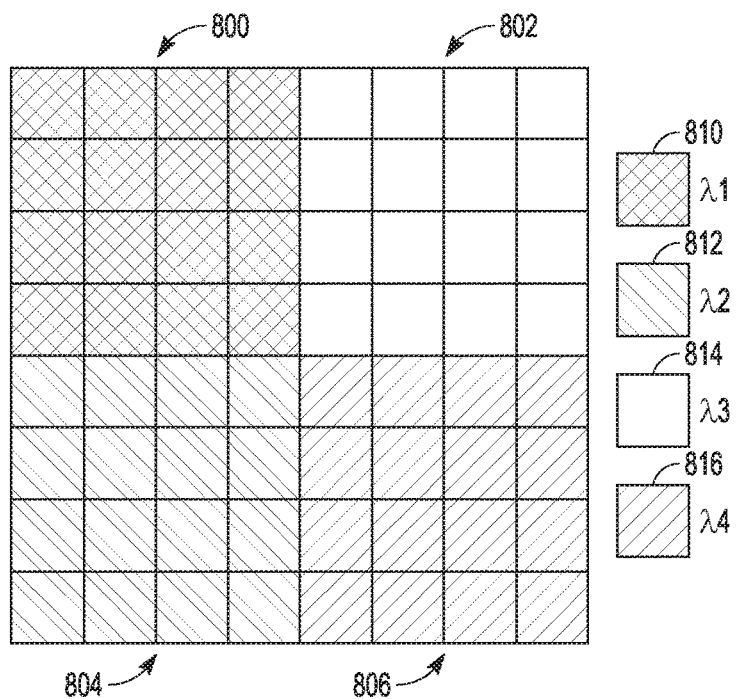

As illustrated in FIG. 11D, responsive to command signals from control circuitry 112 MEMS MMA 106 directs a pair of the optical beams to scan leading edge region 728 in parallel and the other two optical beams to revisit (rescan) features 732 in a previously scanned portion of the scene. This provides the system with considerable flexibility to scan the scene, analyze the imagery to identify features of interest and then to revisit those features to perform another or different scan without interrupting the scan of the current leading edge region 728 in the direction of motion. The MEMS MMA enables continuing the primary scan uninterrupted while investigating other features of interest.

As illustrated in FIGS. 12A-12D, responsive to command signals from control circuitry 112 MEMS MMA 106 is partitioned into four segments 800, 802, 804 and 806 each including a plurality of mirrors 140. The mirrors in the different sections are provided with reflective coatings 810, 812, 814 and 816 at different wavelengths. The segments do not need to be equally sized, can be any portion of the array and can be changed on the fly in number, size or location. A single broadband source may be positioned to emit electromagnetic radiation that spans all of the wavelengths onto the entire MEMS MMA. It is more efficient to use multiple narrowband sources 818 positioned to emit radiation at the wavelength corresponding to a respective section. In response to command signals, the MEMS MMA tips/tilts/pistons the mirrors in each segment to independent form and scan optical beams 820, 822, 824 and 828 over different portions of scene. Additional piston actuation may be included to compensate for path length variation and/or to correct for atmospheric distortion in some or all of the optical beams at the different wavelengths. In response to command signals, the MEMS MMA may form and scan all of the optical beams over the first portion of the scene (the leading edge region) to provide multi-spectral illumination. Alternately, the MEMS MMA may scan one or more of the optical beams over the first portion of the scene while scanning one or more of the optical beams at different wavelengths over a different portion of the scene e.g. features in previously scanned regions of the scene. In addition, one or more sections at a given wavelength may be partitioned into multiple segments thereby generate a plurality of independently scanned optical beams at the given wavelength.

As illustrated in FIG. 13, responsive to command signals from control circuitry 112 MEMS MMA 106 is partitioned into two sections 900 and 902 each including a plurality of mirrors 140. Optical sources 904 and 906 are positioned to emit electromagnetic radiation to illuminate the mirrors in sections 900 and 902, respectively. Responsive to command signals the MEMS MMA tips/tilts/pistons the mirrors in sections 900 and 902 to form optical beams 908 and 910, respectively. The mirrors within in each section are further responsive to command signals to tip/tilt/piston the mirrors to combine optical beams 908 and 912 into a combined optical beam 914 that is scanned over at least the first portion of the scene. If the sources are of the same wavelength, the combined beam behaves as if it were emitted from a single aperture laser, but with higher power than can be obtained from a single source aperture. If the sources are of different wavelength, the combine beam is multi-spectral.

Figure 14:
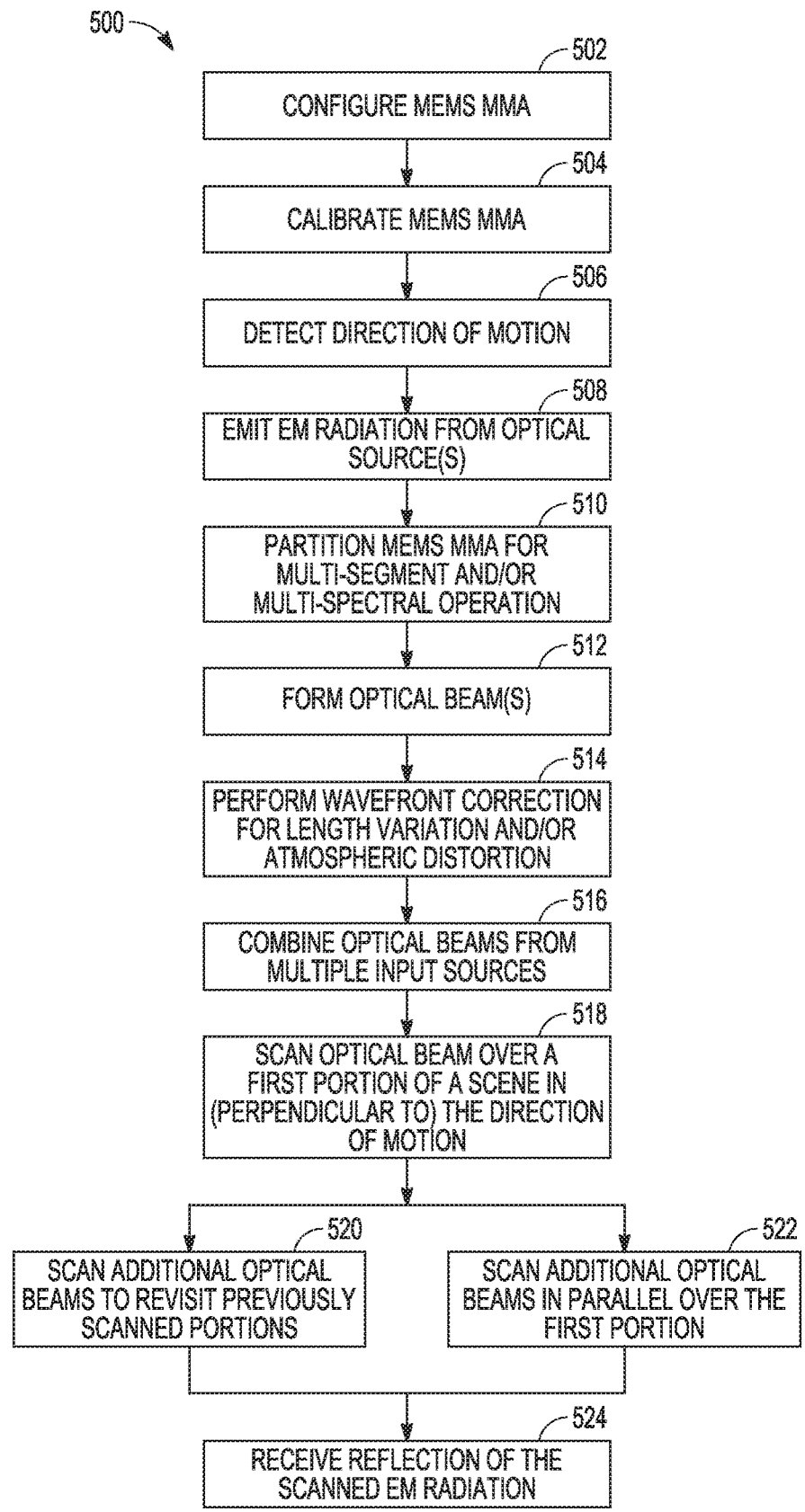
FIG. 14 is an example process flow according to aspects of the invention.

As described above with reference to FIGS. 1-13, several embodiments perform processes that improve known schemes for active imaging. In some embodiments, these processes are executed by an active imaging system, such as the active imaging system 100 described above with reference to at least FIG. 1. One example of such a process is illustrated in FIG. 14. According to this example, the process 500 may include the acts of configuring and calibrating the MEMS MMA, detecting a direction of motion, emitting electromagnetic radiation from an optical source, partitioning the MEMS MMA for multi-segment and/or multi-spectral operation, forming the optical beam(s), performing wavefront correction for path length variation or atmospheric distortion, scanning the electromagnetic radiation over a portion of the scene corresponding to an edge region of a field-of-view in the direction of motion and possibly revisiting selected portions of previously scanned scene, and receiving reflections of the electromagnetic radiation at an optical receiver. The example process 500 of FIG. 5 is described with continuing reference to the imaging system 100 illustrated in at least FIG. 1.

In act 502 the process 500 may include, configuring the MEMS MMA to, for example, provide just tip/tilt actuation or tip/tilt/piston actuation, and provide different sections of the MMA with different reflective coatings for independent multi-spectral operation or the same broadband coating to produce each optical beam with multiple spectral components.

In act 504 the process 500 may include calibrating the MEMS MMA to determine the command signals to form or focus a particular optical beam, to provide specific scan angles and to compensate for path length variation of the optical beam(s). For each of these the command signals to tip/tilt/piston each mirror can be stored in different LUTs.

In act 506 the process 500 may include, detecting a direction of motion relative to a scene to be imaged. In certain examples, detecting the direction of motion may include detecting the direction of motion within a single-dimensional direction, while in other examples detecting the direction of motion may include detecting the direction of motion within a two-dimensional direction. As further discussed above, each dimensional direction (e.g., a first dimensional direction, a second dimensional direction, etc.) may be orthogonal to the other dimensional directions. In certain examples, detecting the direction of motion may include receiving a plurality of GPS positioning signals and determining a direction of movement of the imaging system 100 based on ascertained coordinates. However, in certain other examples, the process 500 may include detecting the direction of motion of the imaging system 100 relative to the scene based at least in part on a variation of a feature within the scene between one or more images of the scene. For example, the process 500 may include detecting a direction of motion of the scene based on movement of a feature, within the scene, between consecutively generated images of the scene.

In act 508, the process 500 may include emitting electromagnetic radiation from the optical source(s) along the transmit path (s). A single narrowband or broadband optical source may illuminate the entire MEMS MMA. Multiple sources may illuminate different sections of the MEMS MMA and be combined into a single beam. Multiple narrowband sources at different wavelengths may illuminate different sections of the MEMS MMA for independent multi-spectral scanning.

In act 510, the process 500 may partition the MEMS MMA for multi-segment, multi-spectral or beam combined operation. In act 512, the mirrors within each partitioned are actuated to form the one or more optical beams at the same or different wavelengths.

In act 514, the MEMS MMA provides additional piston (translation) actuation of selected mirrors to perform wavefront correction on the optical beam(s) to compensate for path length variation and/or atmospheric distortion.

In act 516, if so configured, process 500 combines optical beams from multiple sources to increase power or form a multi-spectral beam.

In act 518, the process 500 scans an optical beam over at least a first portion of the scene in a leading edge region in (perpendicular to) the direction of motion. The optical beam is generally scanned perpendicular to the direction of motion to cover the leading edge region. Act 518 may further include scanning additional optical beams to revisit previously scanned portions in act 520 or scanning additional optical beams in parallel over the first portion of the scene in act 522.

In act 524, the process 500 may include receiving, within the field-of-view of the optical receiver 108, reflections of the electromagnetic radiation from at least the scanned portion of the scene (e.g., the first portion and/or second portion of previously scanned regions). In particular examples, the process 500 may further include activating a subset of the plurality of pixels of the optical receiver to collect the reflections of the electromagnetic radiation. In particular examples, the subset of the plurality of pixels corresponds to the edge region(s) of the field-of-view. Specifically, activating the subset of the plurality of pixels includes activating at least one of a single row of pixels or a single column of pixels of the optical receiver 108. Such pixels may be positioned at a perimeter of the optical receiver 108.

While not explicitly illustrated or described with reference to FIG. 5 for the convenience of description, the example process 500 illustrated therein may include further acts and processes. Examples of these additional acts and processes are described with reference to the example active imaging system 100 illustrated in FIGS. 1-13.

Accordingly, various aspects and embodiments discussed herein provide an active imaging system configured to perform rapid imaging scans based on the real-time movements of the imaging system, while also maintaining a reduced weight, size, and power consumption. Specifically, certain examples may scan a leading edge, a trailing edge, or other desired sections of a scene that are less than an entire field-of-view of the receiver. Such examples offer the benefit of improved imaging efficiency, in addition allowing the recapture of missed image data, recapture of image data from desired sections of the scene, and dynamic tracking of features within the scene. Such features are particularly beneficial when the imaging system (and/or features within the scene) is in motion.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

We claim:

1. An active imaging system comprising:
a positioning system configured to detect a direction of motion of the imaging system relative to a scene to be imaged;
a plurality of optical sources positioned to emit electromagnetic radiation at the same wavelength along different transmit paths;
a Micro-Electro-Mechanical System (MEMS) Micro-Mirror Array (MMA) comprising a plurality of independently and continuously controllable mirrors to tip and tilt each mirror about first and second orthogonal axes to form the beam, said MEMS MMA partitioned into a plurality of sections positioned along the different transmit paths to receive the electromagnetic radiation from the plurality of optical sources and responsive to command signals to tip and tilt the mirrors to form the electromagnetic radiation in a plurality of optical beams, each section further responsive to command signals to tip and tilt the mirrors to combine the plurality of optical beams into a combined optical beam to scan at least a first portion of the scene within a field-of-view of an optical receiver, wherein the combined optical beam behaves as if it were emitted from a single aperture optical source but with higher power than can be obtained from one of the optical sources; and
the optical receiver positioned to receive reflections of the electromagnetic radiation from at least the first portion of the scene within the field-of-view,
wherein the first portion of the scene is within a first edge region of the field-of-view of the optical receiver, the first edge region being in the direction of motion of the imaging system.

2. An active imaging system comprising:
a positioning system configured to detect a direction of motion of the imaging system relative to a scene to be imaged;
at least one optical source positioned to emit electromagnetic radiation along a transmit path;
a Micro-Electro-Mechanical System (MEMS) Micro-Mirror Array (MMA) comprising a plurality of independently and continuously controllable mirrors to tip and tilt each mirror about first and second orthogonal axes, and to translate in a third axis orthogonal to a plane containing the first and second orthogonal axes, said MEMS MMA positioned along the transmit path to receive the electromagnetic radiation from the at least one optical source and responsive to command signals to tip, tilt and translate the mirrors to focus and scan the electromagnetic radiation in an optical beam over at least a first portion of the scene within a field-of-view of an optical receiver; and
the optical receiver positioned to receive reflections of the electromagnetic radiation from at least the first portion of the scene within the field-of-view,
wherein the first portion of the scene is within a first edge region of the field-of-view of the optical receiver, the first edge region being in the direction of motion of the imaging system;
a separate optical source positioned to emit electromagnetic radiation having a flat-top intensity profile and a wavefront sensor to measure a wavefront of the reflected electromagnetic radiation off of the scene, wherein responsive to the measured wavefront and command signals the MEMS MMA translates the mirrors to produce deviations from a continuous mirror surface to provide wavefront correction for the optical beam to compensate for atmospheric distortion.

3. An active imaging system comprising:
a positioning system configured to detect a direction of motion of the imaging system relative to a scene to be imaged;
at least one optical source positioned to emit electromagnetic radiation along a transmit path;
a Micro-Electro-Mechanical System (MEMS) Micro-Mirror Array (MMA) comprising a plurality of independently and continuously controllable mirrors to tip and tilt each mirror about first and second orthogonal axes, said MEMS MMA positioned along the transmit path to receive the electromagnetic radiation from the at least one optical source, wherein responsive to command signals the MEMS MMA partitions the mirrors into a plurality of segments, each segment comprising a plurality of mirrors responsive to command signals to tip and tilt the mirrors to form and independently scan the electromagnetic radiation into a laser beam over at least a first portion of the scene within a field-of-view of an optical receiver; and
the optical receiver positioned to receive reflections of the electromagnetic radiation from at least the first portion of the scene within the field-of-view,
wherein the first portion of the scene is within a first edge region of the field-of-view of the optical receiver, the first edge region being in the direction of motion of the imaging system.

4. The active imaging system of claim 3, wherein the MEMS MMA is responsive to command signals to scan the plurality of laser beams in parallel over different sub-portions of the first portion of the scene.

5. The active imaging system of claim 3, wherein the MEMS MMA is responsive to command signals to fix the plurality of laser beams to instantly illuminate the entire first portion of the scene.

6. The active imaging system of claim 3, wherein the MEMS MMA is responsive to command signals to scan at least one of the plurality of laser beams over the first portion of the scene and to scan at least one of the plurality of focused laser beams to revisit a previously scanned portion of the scene.

7. The active imaging system of claim 3, wherein said mirrors are configured to translate in a third axis orthogonal to a plane containing the first and second orthogonal axes to focus and scan the laser beam.

8. An active imaging system comprising:
a positioning system configured to detect a direction of motion of the imaging system relative to a scene to be imaged;

at least one optical source positioned to emit electromagnetic radiation over a broadband that includes multiple discrete wavelengths along a transmit path;

a Micro-Electro-Mechanical System (MEMS) Micro-Mirror Array (MMA) comprising a plurality of independently and continuously controllable mirrors to tip and tilt each mirror about first and second orthogonal axes, wherein the mirrors are provided with a reflective coating that reflect over a band that includes the multiple discrete wavelengths, said MEMS MMA positioned along the transmit path to receive the electromagnetic radiation from the at least one optical source and responsive to command signals to tip and tilt the mirrors to form and scan the electromagnetic radiation in an optical beam that comprises the multiple discrete wavelengths over at least a first portion of the scene within a field-of-view of an optical receiver; and the optical receiver positioned to receive reflections of the electromagnetic radiation from at least the first portion of the scene within the field-of-view, wherein the first portion of the scene is within a first edge region of the field-of-view of the optical receiver, the first edge region being in the direction of motion of the imaging system.

9. The active imaging system of claim 8, wherein responsive to command signals at least one section of the MEMS MMA is partitioned into a plurality of segments each segment comprising a plurality of mirrors, wherein within each segment the mirrors are responsive to command signals to tip and the mirrors to form the electromagnetic radiation into an optical beam at the wavelength of the corresponding section.

10. The active imaging system of claim 8, wherein responsive to command signals the MEMS MMA scans the plurality of optical beams at the different wavelengths over the first portion of the scene.

11. The active imaging system of claim 8, wherein responsive to command signals the MEMS MMA scans at least one optical beam over the first portion of the scene and another optical beam at a different wavelength over a different portion of the scene.

12. The active imaging system of claim 8, wherein said mirrors are configured to translate in a third axis orthogonal to a plane containing the first and second orthogonal axes to focus and scan the optical beam.

13. The active imaging system of claim 12, wherein a plurality of the mirrors are responsive to command signals to tip, tilt and translate to approximate a single continuous mirror surface to focus and scan the optical beam.

14. The active imaging system of claim 12, further comprising an optically transparent window, wherein responsive to command signals the MEMS MMA translates the mirrors to produce deviations from a continuous mirror surface to compensate for path length variation of the optical beam through the optically transparent window.

15. The active imaging system of claim 8, wherein a plurality of optical sources are positioned to emit electromagnetic radiation over the same broadband along different transmit paths, where said MEMS MMA is partitioned into a plurality of sections positioned along the different transmit paths to receive the electromagnetic radiation from the plurality of sources and responsive to command signals to tip and tilt the mirrors to form the electromagnetic radiation into a plurality of optical beams, each section further responsive to command signals to combine the plurality of optical beams into a combined optical beam to scan at least the first portion of the scene, wherein the combined optical beam behaves as if it were emitted from a single aperture optical source but with higher power than can be obtained from one of the optical sources.

16. An active imaging system comprising:

a positioning system configured to detect a direction of motion of the imaging system relative to a scene to be imaged;

at least one optical source positioned to emit electromagnetic radiation along a transmit path;

a Micro-Electro-Mechanical System (MEMS) Micro-Mirror Array (MMA) comprising a plurality of independently and continuously controllable mirrors to tip and tilt each mirror about first and second orthogonal axes, said MEMS MMA positioned along the transmit path to receive the electromagnetic radiation from the at least one optical source and responsive to command signals to tip and tilt the mirrors to form and scan the electromagnetic radiation in an optical beam over at least a first portion of the scene within a field-of-view of an optical receiver; and the optical receiver positioned to receive reflections of the electromagnetic radiation from at least the first portion of the scene within the field-of-view, wherein the first portion of the scene is within a first edge region of the field-of-view of the optical receiver, the first edge region being in the direction of motion of the imaging system;

wherein responsive to command signals the MEMS MMA partitions the mirrors into a plurality of sections each comprising a plurality of mirrors, wherein the mirrors in the different sections comprise reflective coatings designed to reflect at different wavelengths within a specified band, wherein within each section the mirrors are responsive to command signals to tip and tilt the mirrors to form the electromagnetic radiation into an optical beam at the corresponding wavelength.

17. The active imaging system of claim 16, wherein said mirrors are configured to translate in a third axis orthogonal to a plane containing the first and second orthogonal axes to focus and scan the optical beam.

18. The active imaging system of claim 16, wherein each section is further responsive to command signals to combine the plurality of optical beams at the different wavelengths into a multi-spectral optical beam.

19. The active imaging system of claim 18, comprising a plurality of optical sources positioned to emit electromagnetic radiation at the different wavelengths.

20. An active imaging system comprising:

a positioning system configured to detect a direction of motion of the imaging system relative to a scene to be imaged;

a plurality of optical source positioned to emit electromagnetic radiation along different transmit path;

a Micro-Electro-Mechanical System (MEMS) Micro-Mirror Array (MMA) comprising a plurality of independently and continuously controllable mirrors to tip and tilt each mirror about first and second orthogonal axes, said MEMS MMA partitioned into a plurality of sections positioned to receive the electromagnetic radiation from the plurality of optical sources along the different transmit paths, a plurality of mirrors in the different sections comprising reflective coatings designed to reflect at different wavelengths, each section responsive to command signals to tip and tilt the mirrors to focus the electromagnetic radiation in an optical beam at the different wavelengths, each said section further responsive to command signals to tip and tilt the mirrors to combine the plurality of optical beams into a combined multi-spectral optical beam that is scanned over at least the first portion of the scene within a field-of-view of an optical receiver;

the optical receiver positioned to receive reflections of the electromagnetic radiation from at least the first portion of the scene within the field-of-view, wherein the first portion of the scene is within a first edge region of the field-of-view of the optical receiver, the first edge region being in the direction of motion of the imaging system.

21. An active imaging system comprising:

a positioning system configured to detect a direction of motion of the imaging system relative to a scene to be imaged;

a plurality of optical sources positioned to emit electromagnetic radiation at the same wavelength along different transmit paths;

a Micro-Electro-Mechanical System (MEMS) Micro-Mirror Array (MMA) comprising a plurality of independently and continuously controllable mirrors to tip and tilt each mirror about first and second orthogonal axes, and translate in a third axis orthogonal to a plane containing the first and second orthogonal axes to form the beam, said MEMS MMA partitioned into a plurality of sections positioned along the transmit path to receive the electromagnetic radiation from the plurality of optical sources in the respective sections, each section comprising a plurality of mirrors responsive to command signals to tip, tilt and translate the mirrors to approximate a continuous mirror surface to focus the electromagnetic radiation in an optical beam, each section further responsive to command signals to combine the plurality of focused optical beams into a combined focused optical beam to scan at least a first portion of the scene within a field-of-view of an optical receiver, wherein the combined focused optical beam behaves as if it were emitted from a single aperture laser but with higher power than can be obtained from one of the optical sources; and the optical receiver positioned to receive reflections of the electromagnetic radiation from at least the first portion of the scene within the field-of-view, wherein the first portion of the scene is within a first edge region of the field-of-view of the optical receiver, the first edge region being in the direction of motion of the imaging system.

22. An active imaging system comprising:

a positioning system configured to detect a direction of motion of the imaging system relative to a scene to be imaged;

a plurality of optical sources positioned to emit electromagnetic radiation along different transmit paths at different wavelengths;

a Micro-Electro-Mechanical System (MEMS) Micro-Mirror Array (MMA) comprising a plurality of independently and continuously controllable mirrors to tip and tilt each mirror about first and second orthogonal axes, and translate in a third axis orthogonal to a plane containing the first and second orthogonal axes to form the beam, said MEMS MMA partitioned into a plurality of sections positioned along the transmit path to receive the electromagnetic radiation from the plurality of optical sources in the respective sections, each section comprising a plurality of mirrors responsive to command signals to tip, tilt and translate the mirrors to approximate a continuous mirror surface to focus the electromagnetic radiation in an optical beam, each section further responsive to command signals to combine the plurality of focused optical beams at the different wavelengths into a combined focused multi-spectral optical beam to scan at least a first portion of the scene within a field-of-view of an optical receiver; and the optical receiver positioned to receive reflections of the electromagnetic radiation from at least the first portion of the scene within the field-of-view, wherein the first portion of the scene is within a first edge region of the field-of-view of the optical receiver, the first edge region being in the direction of motion of the imaging system.

* * * * *

UNITED STATES PATENT AND TRADEMARK OFFICE
CERTIFICATE OF CORRECTION

PATENT NO. : 11,815,676 B2
APPLICATION NO. : 17/024436
DATED : November 14, 2023
INVENTOR(S) : Uyeno et al.

Page 1 of 1

It is certified that error appears in the above-identified patent and that said Letters Patent is hereby corrected as shown below:

In the Specification

In Column 8, Line 10, delete "116." and insert --108.-- therefor

Signed and Sealed this
Fourth Day of February, 2025

Coke Morgan Stewart
*Acting Director of the United States Patent and Trademark Office*